(12) United States Patent
Kukino et al.

(10) Patent No.: US 7,758,976 B2
(45) Date of Patent: Jul. 20, 2010

(54) CBN SINTERED BODY FOR HIGH SURFACE INTEGRITY MACHINING AND CBN SINTERED BODY CUTTING TOOL

(75) Inventors: Satoru Kukino, Itami (JP); Yoshihiro Kuroda, Itami (JP); Tomohiro Fukaya, Itami (JP); Katsumi Okamura, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 671 days.

(21) Appl. No.: 11/631,002

(22) PCT Filed: May 30, 2006

(86) PCT No.: PCT/JP2006/310756

§ 371 (c)(1),
(2), (4) Date: Dec. 28, 2006

(87) PCT Pub. No.: WO2007/039955

PCT Pub. Date: Apr. 12, 2007

(65) Prior Publication Data

US 2008/0254282 A1 Oct. 16, 2008

(30) Foreign Application Priority Data

Oct. 4, 2005 (JP) ............................. 2005-291250

(51) Int. Cl.
*B32B 9/00* (2006.01)
(52) U.S. Cl. ...................... 428/698; 428/701; 428/702
(58) Field of Classification Search ................. 428/699, 428/698; 501/96.1; 407/107, 113–119
See application file for complete search history.

(56) References Cited

U.S. PATENT DOCUMENTS 5,853,873 A   12/1998   Kukino et al.

(Continued)

FOREIGN PATENT DOCUMENTS

EP    1 547 990 A2   6/2005

(Continued)

OTHER PUBLICATIONS

Machine translation, Noda, JP 08-091936 A (Kyocera Corp), Apr. 9, 1996.*

(Continued)

*Primary Examiner*—Timothy M Speer
(74) *Attorney, Agent, or Firm*—McDermott Will & Emery LLP

(57) ABSTRACT

In high efficiency cutting of very hard and hard-to-cut ferrous materials, compared with conventional cBN sintered body tools, the fatigue life of the machined part is improved and a longer lasting tool is provided by controlling the production of the affected layer by machining formed on the machined surface of the workpiece to be cut and by promoting residual of compression stress.

The cBN sintered body related to the present invention has not less than 60% and not more than 95% of cBN components in volume, and has a thermal conductivity of 70 W/m·K or more; and the outermost surface thereof is coated with a heat resistant film comprising a compound of at least one element selected from 4a, 5a, 6a group elements and Al, and at least one element selected from C, N and O.

10 Claims, 2 Drawing Sheets

U.S. PATENT DOCUMENTS

| | | | |
|---|---|---|---|
| 6,071,841 A | | 6/2000 | Sumiya |
| 6,737,178 B2 * | | 5/2004 | Ota et al. .................... 428/698 |
| 7,081,424 B2 | | 7/2006 | Okamura et al. |
| 7,524,785 B2 * | | 4/2009 | Matsukawa et al. ........ 501/96.4 |

FOREIGN PATENT DOCUMENTS

| | | | | |
|---|---|---|---|---|
| GB | 2 272 703 | A | | 5/1994 |
| JP | 52-43486 | | | 10/1977 |
| JP | 53-77811 | | | 7/1978 |
| JP | 55150941 | A | * | 11/1980 |
| JP | 8-91936 | | | 4/1996 |
| JP | 8-119774 | | | 5/1996 |
| JP | 9-59068 | | | 3/1997 |
| JP | 9-108911 | | | 4/1997 |
| JP | 10-158065 | | | 6/1998 |
| JP | 2002003284 | A | * | 1/2002 |
| JP | 2002-326874 | | | 11/2002 |
| JP | 2005-187260 | | | 7/2005 |
| WO | WO 2005/000508 | A1 | | 1/2005 |
| WO | WO 2005066381 | A1 | * | 7/2005 |
| WO | WO 2006/046753 | A1 | | 5/2006 |

OTHER PUBLICATIONS

Machine translation, Fumihiro, JP 09-059068 A, Mar. 4, 1997.*
Machine translation of JP 2002-003284, Kobata, Jan. 2002.*
Translation of JP 55-150941, Murai, Nov. 1980.*
International Preliminary Report on Patentability and Written Opinion of the International Searching Authority, issued in corresponding International Patent Application No. PCT/JP2006/310756, mailed Sep. 18, 2008.
International Preliminary Report on Patentability and Written Opinion of the International Searching Authority, issued in corresponding International Patent Application No. PCT/JP2006/310756, mailed Apr. 17, 2008.
W. Kalss, "Latest Developments and Applications in Coating Technologies", First International HSS Forum Conference, Aachen, Germany, Feb. 3, 2005, XP 002529825.
Supplementary European Search Report issued in European Patent Application No. EP 06 74 6984, dated Jun. 18, 2009.

* cited by examiner (a)

(b)

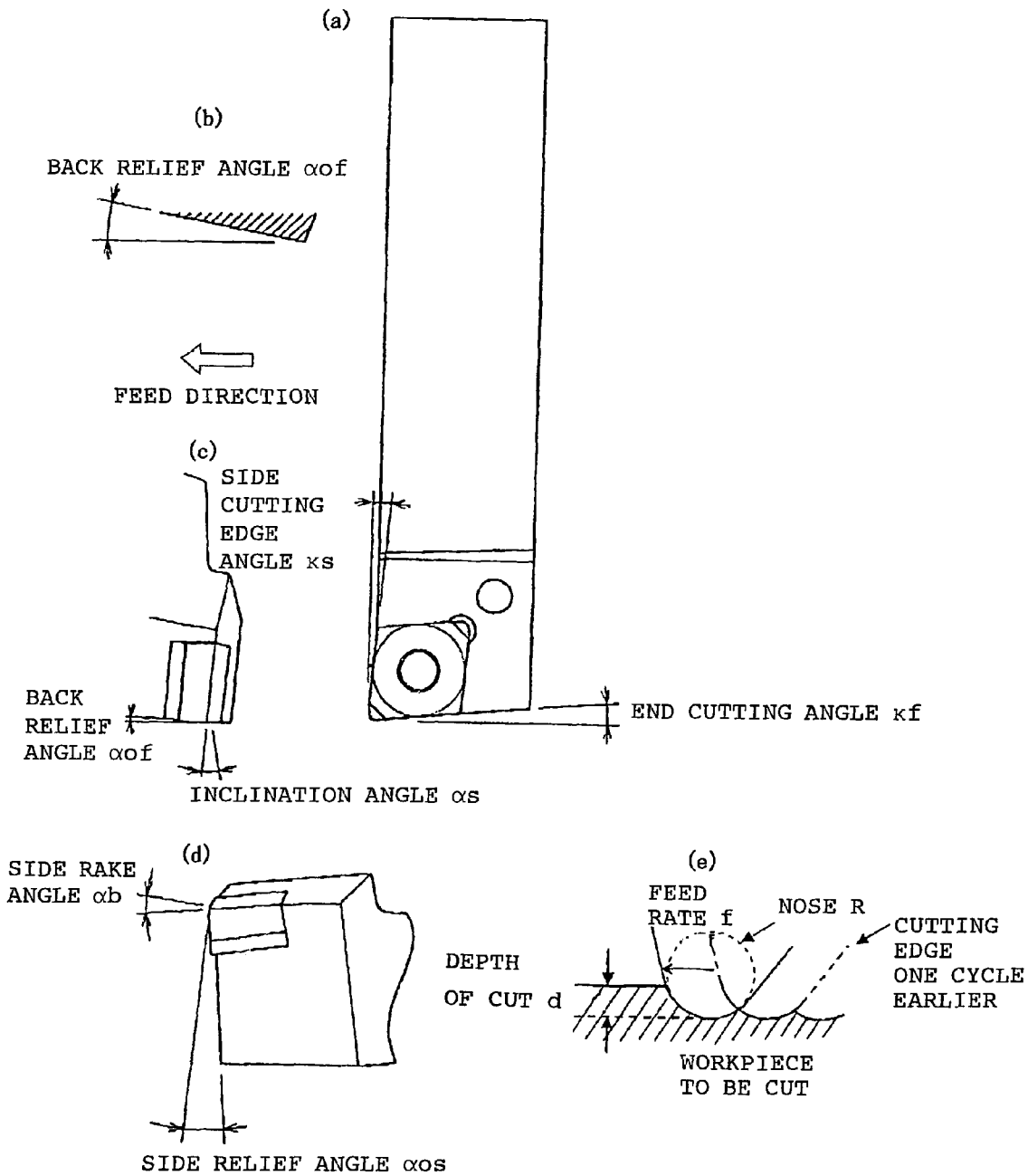

US 7,758,976 B2

CBN SINTERED BODY FOR HIGH SURFACE INTEGRITY MACHINING AND CBN SINTERED BODY CUTTING TOOL

RELATED APPLICATIONS

This application is a national phase of PCT/JP2006/310756 filed on May 30, 2006, which claims priority from Japanese Application No. 2005-291250 filed Oct. 4, 2005, the disclosures of which Applications are incorporated by reference herein. The benefit of the filing and priority dates of the International and Japanese Applications is respectfully requested.

TECHNICAL FIELD

The present invention relates to a cBN sintered body for high surface integrity machining in the cutting of ferrous materials that are extremely hard and hard-to-cut materials, and by controlling the cutting edge temperature during cutting, the production of an affected layer by machining on the cut surface of the machined part is suppressed, residual compression stress is promoted, the fatigue life of the machined part is improved, and the lifespan of cutting tool is elongated.

BACKGROUND ART

For example, compared to conventional materials for cutting tools such as ultra-hard tools, etc., cBN based sintered body cutting tools have material characteristics of high performance that can be highly efficient and long-lasting because of the chemical stability and the extreme hardness of cBN sintered body. In addition, cBN sintered body cutting tools are highly valued for their superior flexibility and high environmental-friendly productivity compared to grinding tools, and they have substituted for conventional tools in the machining of hard-to-cut ferrous materials.

cBN sintered body materials can be classified into two types: one type is a sintered body comprising cBN particles and binder materials, in which the cBN content ratio is high, the cBN particles bond each other, and the main components of the remainder are Co and Al as described in Patent Document 1, or is a sintered body that does not comprise any component other than cBN as much as possible, as described in Patent Document 2 (called "high cBN content ratio sintered body" hereinafter). The other type has a comparatively low cBN content ratio, has a low contact ratio between cBN particles, and is bonded through a ceramic comprising Ti nitrides (TiN) and carbides (TiC) that show a low affinity with iron, as disclosed in Patent Document 3 (called "low cBN content ratio sintered body" hereinafter).

In uses in which chips are split off and are not likely to generate shear heat, the former type, high cBN content ratio sintered body achieves outstanding stability and long lifetime because of the superior mechanical characteristics (extreme hardness, high strength, high toughness) and high thermal conductivity of the cBN; and it is suitable for cutting of ferrous sintered parts and gray cast iron in which mechanical wear and damage caused by rubbing against hardened particles and damage caused by thermal impact based on high speed interrupted cutting predominate.

Nonetheless, in machining of steel and hardened steel in which the cutting edge is exposed to a high temperature by large quantity of shear heat produced by continuous cutting, the lifespan is shorter than that of conventional carbide tools and ceramic tools because wear is rapidly advanced by the thermal wear of the cBN component with the iron.

Meanwhile, the latter, low cBN content ratio sintered body manifests superior wear-resistance characteristics based on the workings of ceramic binder comprising TiN and TiC, which have a low affinity with iron at high temperatures, and in particular, in hardened steel machining which cannot be machined practically with conventional carbide tools and ceramic tools, low cBN content ratio sintered body has positively substituted in grinding as a cutting tool that can achieve a tool life ten to several dozen times that of conventional tools.

In recent years, by increasing rigidity of machine tools, adjusting the percentages of cBN and the ceramic binder comprising TiN and TiN in low cBN content ratio sintered bodies, cBN sintered body tools are applied instead of grinding tools to machining applications in which the required precision is 3.2 μm to 6.3 μm in ten point averaged roughness (abbreviated "Rz" hereinafter), for example, as in cutting of automotive transmission parts comprising hardened steel, which is a steel with a surface hardness enhanced to Hv 4.5 GPa to 7.6 GPa by the so-called hardening treatment such as carburized hardening.

Recently, in sliding surfaces and rotating surface, etc. that require a high precision surface roughness of Rz 0.4 μm to 3.2 μm, studies have begun on the application of cutting tools comprising low cBN content ratio sintered body instead of grinding, which has restrictions in terms of machining efficiency and flexibility, in uses for the final finishing step requiring high surface integrity having sufficient fatigue strength in the machined region, or for semi-finish machining to obtain a high surface integrity using only finish processing with an ultra-fine machining allowance of 5 to 10 μm or less, such as machine honing, which needs a smaller machining allowance than the conventional grinding process.

Patent Document 1: Japanese Patent Publication No. S52-43486
Patent Document 2: Japanese Patent Publication No. H10-158065
Patent Document 3: Japanese Patent Publication No. S53-77811
Patent Document 4: Japanese Patent Publication No. H08-119774

DISCLOSURE OF THE INVENTION

However, when cutting hardened steel with a machining efficiency of cutting speed V=100 m/min, depth of cut d=0.15 mm, and feed rate f=0.08 mm/rev. (chip removal volume W per unit time is 1,200 mm³/min) or more, which are judged to be beneficial to industrially apply cBN sintered body cutting tools to hardened steel machining, an affected layer by machining of a thickness of 1 to 20 μm may be formed on the surface of the machined part. The permissible range for the amount of this affected layer by machining produced is stipulated according to the required fatigue life characteristics, which depend on the various stress environments expected to be applied when the machined part is made to a final product.

Specifically, in cutting of universal joint or race bearing surfaces, which are roller and ball rotational track surfaces, if the thickness of aforementioned affected layer by machining is up to about several μm, this affected layer by machining may act as an extreme hardness protection film greater than the hardness by hardening process. If the thickness of affected layer by machining on the race surface of a bearing for uses applied high stress exceeds 10 μm, there is concern that the damage such as wear, flaking and peeling of the mating surface will be accelerated and the fatigue life will decrease, and therefore, in industry, machine processing is used in another process of time-consuming grinding to remove a machining allowance of several dozen μm.

It is known that when cutting after hardening the production of affected layer by machining increases the more that processing is conducted under high efficiency conditions. Nonetheless, the conditions producing the affected layer by machining and the characteristics of the affected layer by machining itself were not clear in detail.

Thus, for the hardened steel cutting evaluating a variety of cutting conditions using commercial cBN sintered body tools and then researching and analyzing the production of affected layers by processing revealed that the affected layer by machining in hardened steel cutting is composed of martensite as the main component, a mixed phase of residual austenite, bainite, iron oxide and an extremely small amount of iron nitride, etc. The affected layer by machining has a high hardness of about Hv9 GPa to 10 GPa, and is prone to have a tensile stress different from the residual stress of the hardened steel surface, on which the compression stress is supposed to remain principally, and ultimately in almost all cases the tensile stress remains on the machined surface if the thickness of affected layer by machining exceeds 5 μm.

The amount of the aforementioned affected layer by machining produced is serious when machining under high efficiency conditions or when an amount of cutting tool flank wear develops, and therefore, martensite produced on the machined part surface by hardening process changes phase to austenite by the heating during cutting caused by the continuous chip friction heat and the shearing heat, which is particular for hardened steel, as well as by heat during cutting due to the frictional heat between the machined surface of the machined part and the tool flank. And, a mixed phase having a main body of martensite including oxide phase and nitride phase is formed after cutting by rapid cooling in air including oxygen, nitrogen and water vapor. Consequently, when the cutting edge passes over the surface machined, the surface is exposed to high temperatures of at least 727° C. or more, which is the austenite transformation temperature of eutectoid steel, and therefore, a mechanism that selective plastic deformation arises on the outermost surface of the machined object by the thermal stress and the compression residual stress of the machined surface is offset works. The hypothesis here obtained is that if the machining surface is exposed to high temperatures at which the thickness of the affected layer by machining exceeds 5 μm, a tensile stress remains on the machined surface based on the mechanism and this tensile stress may lower the fatigue strength depending on the use of the machined parts.

Further, to clarify the characteristics required on the tool side to solve the problem, cutting was carried out by use of $TiC-Al_2O_3$ ceramic and cBN sintered body tools to cut SUJ2 test pieces hardened to a hardness of Hv 7 GPa, in order to evaluate differences in the thickness and form of affected layers by machining with the same cutting edge form, and the same cutting conditions at the time that the width of flank wear was the same. Irrespective of the time at which the width of flank wear was the same, an affected layer by machining was less likely to be produced in cBN sintered body tools than in ceramic tools, and it was revealed that, even if produced, the thickness of the affected layer by machining was ⅔ or less that of the ceramic tools. However, even when using cBN sintered body tools, if the thickness of affected layer by machining exceeds 10 μm, the residual stress was transformed from compression to tension in nearly all cases.

Derived from the aforementioned hypothesis regarding the mechanism of the production of residual stress, it is supposed that the cBN sintered body tool exhibiting a lower cutting edge temperature at the time of cutting influences. In order to further clarify this, the temperature of the cutting edge during cutting was measured using a two-color pyrometer, which can measure the temperature of micro-regions without being affected by the material of the tool or the condition of the tool surface, in the initial stage of cutting with no difference in the width of flank wear. The results unveiled that the cutting temperature in the cBN sintered body tool was 50% to 80% that in the ceramic tool, and the aforementioned hypothesis regarding the affected layer by machining generation mechanism in hardened steel cutting using a cBN sintered body tool was supported by the results obtained.

According to the results of the aforementioned research, in hardened steel cutting, it is necessary to lower the cutting edge temperature of the tool in order to improve the fatigue life of the machined parts, and as the simplest means of solution, it is effective to control the amount of heat generated during cutting by lowering the machining efficiency. However, when conducting a variety of studies with commercial cBN sintered body tools using binder materials of ceramic comprising TiN and TiC for cutting hardened steel, irrespective of whether or not coolant is used, if machining efficiency is of a cutting speed V=70 m/min, depth of cut d=0.15 mm, and feed rate f=0.07 mm/rev. (chip removal volume W per unit time is 735 $mm^3$/min) or more, even at the time of VB=0.1 mm, which is half of VB=0.2 mm, the value of the amount of flank wear VB generally determined to be the lifespan from the perspective of dimensional precision when cutting hardened steel, an affected layer by machining with a thickness of 10 μm is generated, the residual stress is tensile stress, and high efficiency machining, which is one of the great advantages of hardened steel cutting using cBN sintered body tools, becomes impossible.

Thus, it is necessary to develop a means to prevent residual tensile stress while keeping machining efficiency of a chip removal volume W per unit time of 1200 $mm^3$/min or more of one cBN sintered body insert, which is the general machining efficiency in hardened steel cutting using cBN sintered body tools.

As a method to lower the tool cutting edge temperature without lowering the machining efficiency, means i) by effectively releasing the heat generated during cutting due to chip shearing and friction from the cutting edge region to another region, or ii) by taking measures to suppress the actual heat produced during cutting were variously studied.

Focusing on differences in cutting edge temperatures under the same cutting conditions between the aforementioned $TiC-Al_2O_3$ ceramic tools and cBN sintered body tools, the results of various analyses confirmed that, with cBN sintered body tools, the thermal conductivity of the tool was improved and $B_2O_3$ phase superior in lubrication characteristics was formed on the cutting edge surface region by reacting B atoms in the cBN with oxygen under high temperatures during cutting. The obtained results indicate that the heat produced at the tool cutting edge is reduced by decreasing the frictional heat of the chips and the machined part.

First, rather than a conventional cBN sintered body tool, a cBN sintered body composed of a specialized composition superior in thermal conductivity and lubrication characteristic, and a cBN sintered body tool having a structure to effectively release heat generated in the cutting portion to the interior of the tool (insert) were invented.

As a specific measure of aforementioned i), in order to first improve the thermal conductivity of the cBN sintered body itself, rather than binder materials such as TiN, TiC, W compounds, Co compounds and Al compounds, which have thermal conductivity of several tens W/m·K even at the highest level, the content percentage of cBN powder, which has thermal conductivity of 1,000 W/m·K or more next to diamond, was increased, and also in order to reduce the heat resistance of the remaining binder materials as much as possible, the following constitution was adopted in the present invention.

(1) A cBN sintered body for high surface integrity machining, comprising not less than 60% and not more than 95% of cBN component in volume %, having a thermal conductivity of 70 W/m·K or more, an outermost surface of the cBN sintered body being coated with a heat resistant film having a thickness of 0.5 to 12 µm and comprising a compound of at least one element selected from 4a, 5a, 6a group elements and Al, and at least one element selected from C, N and O.

(2) A cBN sintered body comprising not less than 72% and not more than 95% of cBN component in volume %, having a thermal conductivity of 80 W/m·K or more, having as binder materials, at least one selected from nitrides, carbides and carbonitrides of 4a, 5a, 6a group elements and an Al compound having a percentage in said binder materials of not more than 20% in wt %, a ratio of a sum M of mole number of the 4a, 5a, 6a group elements with respect to a sum of mole numbers of C and N in components other than said cBN components being not less than 1.3 and not more than 1.6, and an outermost surface of the cBN sintered body being coated with a heat resistant film having a thickness of 0.5 to 12 µm and comprising a compound of at least one element selected from 4a, 5a, 6a group elements and Al, and at least one element selected from C, N and O.

(3) A cBN sintered body according to (1) or (2) above, wherein, an average particle diameter of cBN particles constituting said cBN sintered body is not less than 2 µm and not more than 4 µm; the cBN component contains carbon, oxygen and at least one element selected from Li, Si, Al, Ca and Mg; a sum of said contained carbon and at least one element selected from Li, Si, Al, Ca and Mg is not less than 0.02% and not more than 0.2% by wt % with respect to said cBN component; the cBN sintered body comprises a highly pure cBN component in which an amount of oxygen with respect to the cBN component is not more than 0.17% by wt %, and has a thermal conductivity of not less than 85 W/m·K.

(4) A cBN sintered body according to any of (1) to (3) above, wherein a mole ratio of B with respect to N in the cBN component constituting the cBN sintered body is not less than 1.15 and not more than 1.20.

(5) A cBN sintered body according to any of (1) to (4) above, wherein said heat resistant film has a thermal conductivity of not less than 30 W/m·K and not more than 45 W/m·K.

The following constitution was adopted in the present invention, in order to promote prevention of the high temperature due to stagnation of the cutting heat in the cutting edge based on high thermal conductivity characteristic of the aforementioned specialized cBN sintered body, and for the carbides and brazing materials on the periphery of the cBN sintered body, the constitution can more reliably achieve a drop in cutting edge temperature during cutting by arranging materials having thermal conductivity of not less than 80 W/m·K and not less than 220 W/m·K, respectively.

(6) A cBN sintered body cutting tool for high surface integrity machining, wherein the cBN sintered body according to any of the aforementioned (1) to (5) above is bonded through a brazing material to or is sintered integrally with a support member comprising carbide, cermet, ceramic or a ferrous material; and the cBN sintered body part and the brazing material part have thermal conductivities of not less than 80 W/m·K.

(7) A cBN sintered body cutting tool according to (6) above, wherein said brazing material part includes at least one selected from Ti and Zr, and at least one selected from Ag and Cu, and is composed of a brazing material having a thermal conductivity of not less than 220 W/m·K, a thickness of the brazing material part is not less than 0.02 mm and not more than 0.20 mm, and no vacancies having a major diameter exceeding 0.5 mm are contained in the brazing material.

(8) A cBN sintered body cutting tool according to (6) or (7) above, comprising 5% to 40% in volume of cBN particles or diamond particles with an average particle diameter of not less than 5 and not more than 150 µm inside said brazing part; and having a thermal conductivity of not less than 280 W/m·K.

(9) A cBN sintered body cutting tool according to any of (6) to (8) above, wherein a region of said heat resistant film having an area of not less than 10% and not more than 80% with respect to a cutting cross-sectional area Q defined by $$Q=\{R^2 \cdot \tan^{-1}[f/\text{sqr}(4R^2-f^2)]+0.25f \cdot \text{sqr}(4R^2-f^2)+f(d-R)\}/(\cos \alpha s \cdot \cos \alpha b),$$

with assuming nose R, depth of cut d, feed rate f, side rake angle αb, and inclination angle αs, is removed in a portion of said cBN sintered body cutting tool participating in cutting, and the cBN sintered body directly contacts a workpiece to be cut during cutting.

(10) A cBN sintered body cutting tool according to any of (6) to (9) above, wherein, in a portion participating in cutting of a tool flank of said cBN sintered body cutting tool, a region of the heat resistant film having an area of not less than 10% and not more than 80% with respect to said cutting cross-sectional area Q is removed, and the cBN sintered body directly contacts a workpiece to be cut during cutting.

Further, as a specific measure relating to the aforementioned ii), it is also desirable to increase the content percentage of the cBN component that is the source of supply for the $B_2O_3$ phase having the aforementioned lubricating function and to apply cBN particle having a composition such that the mole ratio of B to the N in the cBN component constituting the cBN sintered body is not less than 1.15 and not more than 1.20 to the cBN sintered body of the present invention by reviewing the stoichiometry of the cBN source material powder without adding, for example, $TiB_2$ and $AlB_2$ compounds richer in reactivity with iron than the cBN particles, which lower the wear resistance and defect resistance of the sintered body in order to homogenously produce a suitable amount of $B_2O_3$ phase.

As a method to modify the stoichiometry of the cBN particles to the range of the present invention, cBN particles with a composition such that the mole ratio of B to N in the cBN component is not less than 1.15 and not more than 1.20 can be obtained by enclosing the mixture of the binder powder and the cBN particles inside the sintering capsule in a Ti capsule, by placing the source material powder in a vacuum atmosphere, and by heating to a temperature of 1,000 to 1,200° C. at 3 to 3.5 GPa, which is a pressure and temperature region for stable cBN, and is a pressure at which gaps are not squashed and the nitrogen between the cBN particles and the binder is easily removed.

In uses for cutting of hardened steel which needs a requisite precision of Rz 0.4 µm to 3.2 µm, the surface roughness of the machined surface is worsened by: a) the stage difference of the highs and lows of the feed marks that are transferred to the surface of the machined object because of striated wear produced on the tool flank; and b) the development of waveness due to an increase of the width of tool flank wear.

The development of striated wear in a) agrees with the rotation direction of the hardened steel and the cutting edge flank, then it is understood that the wear develops mechanically while high stress is applied to the cBN particles and binder materials when scraping, and this high stress causes particle drop out and fracture.

Actually, in conventional technology, in order to decrease the stage difference of the highs and lows of the feed marks of the aforementioned a), the aforementioned worsening of the surface roughness is suppressed every so often by machining while increasing the amount of heat produced at the cutting edge and softening the machined object and chips under high speed conditions of V=150 m/min or more. It is common industrial knowledge that to address the disadvantage that flank wear induced by thermal factors in this case is easily produced by the heat generated under higher speed conditions, the cBN content percentage is set at 40% or more and less than 65% by volume, and cBN sintered body material which is strong against thermal wear because of the large percentage of binder materials comprising TiN and TiC ceramics with lower affinity to iron than cBN at high temperatures and which has thermal conductivity characteristic of at highest 50 W/m·K is used. Accordingly, in principle, in the method of improving the surface roughness by promoting the high speed conditions, it was difficult to prevent residual tensile stress by suppressing heat production at the tool cutting edge part, and this is the problem for the present invention.

Meanwhile, some conventional cBN sintered bodies described in Patent Document 2 that has a cBN component of not less than 60% by volume and has an Al compound and at least one selected from nitrides, carbides and carbonitrides of 4a, 5a, and 6a group elements as binder materials, have a thermal conductivity of 65 W/m·K. But, in conventional cBN sintered body tools in which the cBN sintered body having this cBN component is simply brazed to a base metal made of carbide, even if suppression of the affected layer by machining was improved during the initial cutting period, flank wear up to about 100 µm developed in the stage from ten plus minutes to several dozen minutes after beginning cutting, the aforementioned waveness in b) increased needless to say, the wear resistance was insufficient, and practical cutting was impossible in continuous cutting uses for the finish cutting of hardened steel. cBN sintered body tools with this conventional cBN sintered body coated with a TiAlN film as disclosed in Patent Document 4 can somewhat suppress flank wear, but, offset by worsening thermal characteristic based on the function of the TiAlN film to insulate heat, the thickness of affected layer by machining produced was not improved.

Without considering the roughness of the surface to be machined, if hardened steel cutting was conducted under low speed conditions of less than V=70 m/min with the aims of lowering the cutting temperature to suppress the affected layer by machining and keeping compression stress, cutting was not possible with the aforementioned conventional cBN sintered body or TiAlN film coated cBN sintered body tools because of chipping caused by insufficient material strength in the initial cutting period several minutes after beginning cutting.

Thus, even with a cBN sintered body having a cBN component not less than 60% and not more than 95% in volume, in which thermal wear of the cBN sintered body was unavoidable in conventional constitutions because of the increase in cutting edge temperature, by supporting a cBN sintered body having high thermal conductivity and high lubricating property on a highly thermal-conductive support member as previously described, the temperature increase can be lowered in the present invention. And, even under a lower speed condition in which conventional cBN tools can not achieved good surface precision, even in hardened steel cutting uses that need a requisite precision of Rz 0.4 µm to 3.2 µm with a processing efficiency of a chip removal volume W per unit time of 1,200 mm$^3$/min or more, by taking advantage of the high strength characteristics based on a high cBN content percentage, a lifespan equivalent to when a conventional cBN sintered body tool for hardened steel cutting is used under higher speed conditions can be achieved, while preventing residual of tensile stress.

EFFECTS OF THE INVENTION

Utilizing a tool comprising a cBN sintered body of the present invention, in the use of cutting hardened steel parts having a hardness of Hv 4.5 GPa or more, provides the effects of suppressing the production of an affected layer by machining on the cutting surface of the machined part, promoting residual of compression stress, enhancing the fatigue life of the machined part and improving the lifespan of the cutting tool because cutting edge temperature and heat are suppressed during cutting.

BEST MODE FOR CARRYING OUT THE INVENTION

As shown in FIG. 1, cBN sintered body cutting tool 10 of the present invention can greatly improve wear resistance, that is, tool lifespan, while preventing residual of tensile stress due to an increase of cutting edge temperature, which is a disadvantage of low thermal conductivity ceramics, by coating the outermost surface of the aforementioned high conductivity cBN sintered body 1 with heat resistant film 2, represented by TiAlN and CrAlN, etc., having a thickness of 0.5 µm to 12 µm.

However, a cBN sintered body with a cBN content percentage exceeding 95% by volume is not desirable because the percentage of binder materials, which is an electric conductor, is too small with respect to the cBN particles, which are semiconductor and then the bonding strength with the heat resistant film formed by arc ion plating PVD is not sufficient to bear under cutting the workpiece after heat treatment.

The heat resistant film 2 of the present invention is preferable because, by making the Al content 0 to 10 at % with respect to the components of the film composition other than C, N, and O, it provides a thermal conductivity of 18 W/m·K or more and the cutting edge temperature lowers. Further, a coating film that is a TiAlVN composition with a V content of 0 to 10 at % and an Al content of 0 to 10 at % with respect to the components of the film composition other than C, N, and O is superior in lubrication characteristic, then is more preferable.

The cBN sintered body cutting tool 10 of the present invention has a structure that the aforementioned cBN sintered body 1 is joined to support member 3 made of carbide, cermet, ceramic, or a ferrous material through brazing material part 4.

A coating film having TiAlMN (M=C, O, Si, V, etc.) composition and an M content of 12 to 20 at % and an Al content of 0 to 10 at % with respect to the components of the film composition other than C, N, and O has a thermal conductivity of not more than 50 W/m·K, because of prevention of the excessive influx of cutting heat to the tool cutting edge, it reduces the width of tool wear and improve the surface integrity of the machined surface.

As a more preferable form, assuming nose R, depth of cut d, feed rate f (see FIG. 2(e)), side rake angle αb (see FIG. 2(d)), and inclination angle αs (see FIG. 2(c)), a tool, in which a region of the aforementioned heat resistant film having an area of not less than 10% and not more than 80% with respect to the cutting cross-sectional area Q defined by $$Q=\{R^2\cdot\tan^{-1}[f/\mathrm{sqr}(4R^2-f^2)]+0.25f\cdot\mathrm{sqr}(4R^2-f^2)+f(d-R)\}/(\cos\alpha s\cdot\cos\alpha b)$$

is removed from the region of the tool participating in cutting indicated in FIG. 2, and also a tool in which the cBN sintered body directly contacts the workpiece to be cut during cutting, is superior in cutting edge heat releasability, and also suppresses the development of tool wear at the heat resistant film, and therefore can achieve longer lifetime with maintaining notably superior surface properties from the initial cutting period.

EXAMPLE 1

A binder powder comprising 15% Al by wt % with respect to TiN, and a commercial cBN powder with an average particle diameter of 3 μm were prepared. As a result of assaying the components other than cBN by high frequency inductively conducted plasma emission analysis (ICP analysis), this cBN powder included 0.18% of oxygen and a total of 0.35% of Li, Si, Al, Ca, Mg, and carbon by weight percentage. The binder material powder and the cBN powder were mixed using a pot and ball made of carbide. The TiN prepared here had a Ti and N mole ratio of 1.6. This mixed powder was filled into a container made of carbide, sintered at a pressure of 8.5 GPa and a temperature of 2,100° C. for 60 minutes, and the various kind of sintered bodies displayed in 11 to 27 of Table 1 were obtained. For each cBN sintered body composition, the product was identified by X-ray diffraction analysis, and the cBN content percentage was assayed by ICP analysis. The thermal conductivity of the cBN sintered bodies was measured by a xenon flash thermal conductivity meter.

Further, cutting was evaluated under the conditions below using tools having the respective cBN sintered bodies in the surface participating in cutting, and having a insert shape classified as ISO model No. CNGA120408.

For all of the inserts, the solid cBN sintered body material without carbide backing was brazed to a substrate made of carbide, cermet, ceramic, or a ferrous sintered material, then the cBN sintered body cutting face and the nose R part were processed by grinding, and subsequently, the aforementioned types of cutting edge shapes were machined. The thickness of the cBN sintered body after the aforementioned cutting edge shape machining was 0.8 mm for all inserts, and the brazed area of the cBN sintered body material bottom surface of the inserts having a nose R of 0.8 R was 3.2 mm². The brazing had a composition of Ag: 76 wt %, Cu: 21 wt %, Zr: 1 wt %, and Ti: 2 wt %; and the brazing was conducted at 850° C. For all samples, the thickness was 0.05 mm, and there were no vacancies in the brazing material.

For all inserts, after brazing the cBN sintered body on the respective insert substrates as previously described, the cBN sintered body cutting face and the nose R part were processed by grinding. Subsequently, further grinding was performed to process the cutting edges of all the aforementioned inserts into a chamfered shape with an angle of −25° and a width of 0.13 mm; when installing the insert in the holder, the inclination angle, the side rake angle, the back relief angle, the side relief angle, the end cutting angle, and the side cutting edge angle were −5°, −5°, 5°, 5°, 5° and −5°, respectively. Finally, after machining the aforementioned cutting edge shape, it was coated with various types of heat resistant films to a thickness of 0.2 to 15 μm by arc ion plating PVD.

workpiece to be cut: JIS model No. SCR415 outer diameter turning machining (DIN model No. 15Cr3), continuous machining Hardness of workpiece to be cut: HRc60

Cutting speed: V=100 m/min

Depth of cut: d=0.15 mm

Feed rate: f=0.08 mm/rev.

Cutting time: 120 min

Coolant: Emulsion (manufacturing source: Japan Fluid System, product name: System Cut 96) 20 times diluted

TABLE 1

| Smpl. No. *1 | cBN sintered body ||||| Heat resistant film || Flank wear width VB μm *4 | Affected layer thickness by machining μm *5 |
| | cBN content volume % | cBN particle diameter μm | Binder composition | Thermal conductivity W/m·K | Substrate *2 | Composition *3 | Film thickness μm | | |
| --- | --- | --- | --- | --- | --- | --- | --- | --- | --- |
| 1 | — | — | Al₂O₃—TiC | 20 | — | — | — | 200 | 35 |
| 2 | — | — | Al₂O₃—TiC | 20 | Carbide | TiAlN | 3 | 110 | 30 |
| 3 | 45 | 2 | TiN, TiB₂, AlB₂, AlN, Al₂O₃ | 35 | Carbide | TiAlN | 3 | 92 | 22 |
| 4 | 50 | 3 | Same as above | 40 | Carbide | TiAlN | 3 | 92 | 20 |
| 5 | 55 | 2 | Same as above | 45 | Carbide | TiAlN | 3 | 93 | 19 |
| 6 | 60 | 3 | Same as above | 52 | Carbide | TiAlN | 3 | 94 | 16 |
| 7 | 65 | 3 | Same as above | 55 | Carbide | TiAlN | 3 | 95 | 15 |
| 8 | 65 | 3 | Same as above | 55 | Carbide | — | — | 180 | 15 |
| 9 | 72 | 3 | Same as above | 60 | Carbide | TiAlN | 3 | 97 | 12 |
| 10 | 80 | 3 | Same as above | 67 | Carbide | TiAlN | 3 | 98 | 11 |
| 11 | 60 | 3 | Same as above | 70 | Carbide | TiAlN | 3 | 95 | 5 |

TABLE 1-continued

| | cBN sintered body | | | | | Heat resistant film | | Flank wear | Affected layer thickness |
|---|---|---|---|---|---|---|---|---|---|
| Smpl. No. *1 | cBN content volume % | cBN particle diameter μm | Binder composition | Thermal conductivity W/m·K | Substrate *2 | Composition *3 | Film thickness μm | width VB μm *4 | by machining μm *5 |
| 12 | 65 | 3 | Same as above | 73 | Carbide | TiAlN | 0.2 | 160 | 11 |
| 13 | 65 | 3 | Same as above | 73 | Carbide | TiAlN | 0.5 | 110 | 3 |
| 14 | 65 | 3 | Same as above | 73 | Carbide | TiAlN | 3 | 95 | 3 |
| 15 | 65 | 3 | Same as above | 73 | Carbide | TiAlN | 5 | 94 | 4 |
| 16 | 65 | 3 | Same as above | 73 | Carbide | TiAlN | 12 | 90 | 5 |
| 17 | 65 | 3 | Same as above | 73 | Carbide | TiAlN | 15 | 90 | 15 |
| 18 | 65 | 3 | Same as above | 73 | Carbide | TiN | 3 | 140 | 8 |
| 19 | 65 | 3 | Same as above | 73 | Carbide | CrAlN | 3 | 120 | 7 |
| 20 | 65 | 3 | Same as above | 73 | Carbide | TiCN | 3 | 115 | 6 |
| 21 | 65 | 3 | Same as above | 73 | Cermet | TiAlN | 3 | 95 | 3 |
| 22 | 65 | 3 | Same as above | 73 | Ceramic | TiAlN | 3 | 95 | 3 |
| 23 | 65 | 3 | Same as above | 73 | P/M | TiAlN | 3 | 95 | 3 |
| 24 | 70 | 3 | Same as above | 75 | Carbide | TiAlN | 3 | 97 | 2 |
| 25 | 72 | 3 | Same as above | 79 | Carbide | TiAlN | 3 | 110 | 1.5 |
| 26 | 90 | 3 | Same as above | 85 | Carbide | TiAlN | 3 | 120 | 0.8 |
| 27 | 95 | 3 | Same as above | 200 | Carbide | TiAlN | 3 | 125 | 0.5 |

*1 Sample 1 is a commercial $Al_2O_3$—TiC (black ceramic) insert formed in a CNGA120408 shape for hardened steel finish cutting, and a piece processed in the same cutting edge preparation as the other samples was used. For sample 2, $Al_2O_3$—TiC (black ceramic) solid material whose size was the same as other cBN sintered body material was cut out with a wire cut from the commercial $Al_2O_3$—TiC (black ceramic) insert of a CNGA120408 shape for hardened steel finish cutting as in sample 1, and, brazing to an carbide substrate, cutting edge preparation and TiAlN coating were performed in the same manner as the other samples, and cutting was evaluated. Samples 3 to 10 are brazed cBN sintered body tools for commercial hardened steel finish cutting that took cBN powder and binding materials powder comprising TiN and Al as the starting material, and were sintered at a pressure of 5 GPa and a temperature of 1,500° C. for 60 minutes. The same cutting edge preparation as with the other samples was processed, and the samples except for sample 8 were coated with TiAlN, and then cutting was evaluated. The thickness of the cBN layer was the same as that of the other samples, and the cBN content percentage, particle diameter and composition, which were investigated by micro-structure observations, XRD analysis and ICP analysis, are described in Table 1. As a result of assaying the components other than cBN component by inductively conducted plasma emission analysis (ICP analysis), this cBN powder comprised 0.18% of oxygen and a total of 0.35% of Li, Si, Al, Ca, Mg and carbon by weight percentage. This binder powder and the cBN powder were mixed using a pot and ball made of carbide. The TiN prepared here is characterized in that the mole ration of Ti to N was 1.7.
*2 The materials used for the substrate are represented. An carbide comprising a WC - 8 wt % Co composition was used for the carbide; a cermet comprising TiC - 5 wt % Ni - 8 wt % Co was used for the cermet; a ceramic made of $Si_3N_4$ was used for the ceramic; and a ferrous sintered part equivalent to JIS SMF4045 was used for the P/M.
*3 The compositions of the materials used for the heat resistant film are represented. The TiAlN is a TiAlN with an atomic ratio of Al to Ti, Al/Ti, of 1; CrAlN is a CrAlN with Al/Cr = 0.7; and TiCN is a TiCN with C/N = 1.
*4 The measured values of the flank wear width VB after 120 minutes of cutting time are represented.
*5 For the cross-section of the machined surface after 120 minutes of cutting time, the thickness of the affected layer by machining was measured after lapping and etching it with nital (ethanol + 5 wt % nitric acid).

As indicated in Table 1, an affected layer thickness by machining of 30 μm or more was produced on sample Nos. 1 and 2, in which ceramic and a ceramic cutting edge were coated with heat resistant film, irrespective of the width of VB wear. Meanwhile, the affected layers produced with cBN cutting tools irrespective of heat resistant coated films were 22 μm or less in all cases.

Among the cBN sintered body cutting tools, samples 11, 13 to 16 and 18 to 27, which were of the present invention then had the superior thermal conductivity, the thickness of affected layer by machining produced was 8 μm or less. In particular, samples 13 to 16, 18 to 27, which had a thermal conductivity of 73 W/m·K or more, were able to achieve a machined surface having excellent surface integrity.

Sample 12 had a thermal conductivity of 73 W/m·K or more, but because the heat resistant film was thin at 0.2 μm, then, it provided little effect to improve the wear resistance of the cBN sintered body. The frictional heat between the machined surface and the flank wear part, which had developed up to VB=160 μm, produced an affected layer by machining of 11 μm, and this layer was thicker than those of the cBN sintered body cutting tools of the present invention.

Sample 17 had a thermal conductivity of 73 W/m·K or more, and greatly suppressed the amount of flank wear at VB=90 μm because the heat resistant film was thick at 15 μm, but conversely, the affected layer by machining was 15 μm, which was thicker than those of the cBN sintered body cutting tools of the present invention. It is understood for the reason that releasing the frictional heat from between the machined surface and the tool flank to the interior of the cBN sintered body was difficult because of the thick heat resistant film, which is inferior in thermal conductivity compared to cBN sintered body, and that the affected layer by machining was more easily produced because the cutting edge temperature more increased than with cBN sintered body cutting tools of the present invention.

EXAMPLE 2 binder materials powder comprising 20% Al by weight with respect to TiN, and commercial cBN powder with an average particle diameter of 2 μm were prepared. As a result of assaying components other than cBN components by inductively conducted plasma emission analysis (ICP analysis), this cBN powder comprised 0.18% of oxygen and a total of 0.35% of Li, Si, Al, Ca, Mg, and carbon by weight percentage. The binder material powder and the cBN powder were mixed using a pot and ball made of carbide. The TiN prepared here is characterized in that the mole ratio of Ti to N was 1.1.

2 weight % melamine resin was added to this mixed powder; this was filled into various types of containers made of carbide, sintered at a pressure of 4.5 GPa and a temperature of 1,900° C. for 60 minutes; and a sintered body, which comprised 70% of cBN components by volume percentage with the remainder binder materials of TiN, $TiB_2$, $AlB_2$, AlN, and $Al_2O_3$ and which had a thermal conductivity of 72 W/m·K, was obtained.

As for the individual sintered body compositions, the products were identified by X-ray diffraction analysis, and the cBN content percentages were quantitatively assayed by ICP analysis. The thermal conductivity of carbide backing and brazing material were solely measured by a xenon flash thermal conductivity meter after removing other materials by grinding.

Cutting was evaluated under the conditions below using tools having the aforementioned cBN sintered body in the surface participating in cutting, and having a insert shape classified as ISO model No. CNGA120408.

For all of the inserts, the cBN sintered body material with an carbide backing was joined using various brazing materials to a substrate of carbide, then the cBN sintered body cutting face and the nose R part of the tool cutting edge part were processed by grinding, and subsequently, the aforementioned types of cutting edge preparation were machined. The thickness of the cBN sintered body and the carbide backing after the aforementioned cutting edge shape machining was 0.8 mm for all inserts, and the brazed area of the cBN sintered body material bottom surface of the inserts having a nose R of 0.8 R was 3.2 $mm^2$. Various brazing material were used for the brazing, and the brazing was conducted at 870° C. in a vacuum atmosphere. For all samples, the thickness of the brazing material in the brazing layer was 0.05 mm, and there were no vacancies in the brazing material.

For all inserts, after brazing the cBN sintered body on the individual types of insert substrate as previously described, the cBN sintered body cutting face and the nose R part were processed by grinding. Subsequently, further grinding was conducted to process the cutting edges of all the aforementioned inserts into a chamfered shape with an angle of −25° and a width of 0.13 mm; when installing the insert in the holder, the inclination angle, the side rake angle, the back relief angle, the side relief angle, the end cutting angle, and the side cutting edge angle were −5°, −5°, 5°, 5°, 5° and −5°, respectively. Finally, after machining the aforementioned cutting edge shape, it was coated with a 1 μm thick of TiAlN heat resistant film having an atomic ratio of Al to Ti, Al/Ti, of 1 by arc ion plating PVD.

Workpiece to be cut: JIS model No. SCR415 outer diameter turning machining (DIN model No. 15Cr3), continuous machining Hardness of workpiece to be cut: HRc58

Cutting speed: V=100 m/min

Depth of cut: d=0.2 mm

Feed rate: f=0.08 mm/rev.

Cutting time: 150 min

Coolant: Emulsion (manufacturing source: Japan Fluid System, product name: System Cut 96) 20 times diluted

TABLE 2

| Smpl. No. | Metal backing made of carbide | | Brazing material | | Flank wear width VB μm *1 | Affected layer thickness by machining μm *2 | Residual stress GPa *3 |
|---|---|---|---|---|---|---|---|
| | Composition Wt % | Thermal conductivity W/m · K | Composition Wt % | Thermal conductivity W/m · K | | | |
| 28 | WC: 95% Co: 5% | 100 | Ag: 70% Cu: 29% Ti: 1% | 220 | 105 | 2 | −5 |
| 29 | WC: 95% Co: 5% | 100 | Ag: 76% Cu: 21% Zr: 1% Ti: 2% | 150 | 107 | 2 | −5 |
| 30 | WC: 95% Co: 5% | 100 | Ag: 76% Cu: 17% Ti: 7% | 120 | 108 | 3 | −4.5 |
| 31 | WC: 95% Co: 5% | 100 | Ag: 44% Cu: 12% Zr: 22% Ti: 22% | 80 | 109 | 4 | −4.3 |
| 32 | WC: 95% Co: 5% | 100 | Cu: 46% Zr: 27% Ti: 27% | 70 | 112 | 8 | −4.1 |
| 33 | WC: 93% Co: 7% | 80 | Ag: 44% Cu: 12% Zr: 22% Ti: 22% | 80 | 109 | 5 | −4.3 |

TABLE 2-continued

| | Metal backing made of carbide | | Brazing material | | Flank wear | Affected layer thickness | |
|---|---|---|---|---|---|---|---|
| Smpl. No. | Composition Wt % | Thermal conductivity W/m·K | Composition Wt % | Thermal conductivity W/m·K | width VB μm *1 | by machining μm *2 | Residual stress GPa *3 |
| 34 | WC: 93% Co: 7% | 80 | Ag: 70% Cu: 29% Zr: 1% | 220 | 108 | 4 | −4.3 |
| 35 | WC: 80% TiC: 10% Co: 10% | 70 | Same as above | 220 | 118 | 9 | −3.5 |
| 36 | WC: 70% TiC: 20% Co: 10% | 40 | Same as above | 220 | 120 | 10 | −0.2 |

*1 The measured values of the width of flank wear VB after 150 minutes of cutting time are represented.
*2 After 150 minutes of cutting time, the thickness of the affected layer by machining was measured after lapping the cross-section of the machined surface and etching it with nital (ethanol + 5 wt % nitric acid).
*3 After 150 minutes of cutting time, the residual stress of the machined surface was measured by the sin2Ψ method (iso-inclination method) using a microregion X-ray stress analyzer. The minus sign in the Table indicates that compression stress was added.

As shown by samples 28 to 32 in Table 2, among the cBN sintered body cutting tools of the present invention having a metal backing made of carbide of the same composition manufactured from cBN sintered body material of the same composition using various kinds of brazing materials, notably, the tools that used brazing material having a thermal conductivity of 80 W/m·K or more produced less affected layer by machining and had higher residual compression stress values.

As indicated by samples 34 to 36, among the cBN sintered body cutting tools of the present invention having a metal backing made of carbide of the differing compositions manufactured from cBN sintered body material using brazing material of the same composition, notably, the tool that used metal backing made of carbide having a thermal conductivity of 80 W/m·K or more produced less affected layer by machining and had higher residual compression stress values.

It is understood for the reason that: because the heat generated during cutting is conveyed from the interior of the cBN sintered body of the present invention, which is superior in thermal conductivity, to the carbide backing and brazing material of the present invention, which superior in thermal conductivity, then, increase of the cutting edge temperature is suppressed and the ratio of flowing heat to the machined surface decreases.

EXAMPLE 3

As shown in Table 3, binder materials powder comprising 3 to 25% Al by weight with respect to at least one selected from TiN, TiC and ZrN, and a commercial cBN powder with an average particle diameter of 4.5 μm were prepared. As a result of assaying components other than cBN by inductively conducted plasma emission analysis (ICP analysis), this cBN powder contained 0.18% of oxygen and a total of 0.35% of Li, Si, Al, Ca, Mg, and carbon by weight percentage. These binder materials powder and cBN powder were mixed using a pot and ball made of carbide.

These individual mixed powders were filled into a container made of carbide, sintered at a pressure of 5.5 GPa and a temperature of 1,850° C. for 60 minutes, and sintered bodies, which comprised not less than 72% and not more than 99% of cBN by volume with a remainder of the binders TiN, TiB$_2$, AlB$_2$, AlN and Al$_2$O$_3$, and which had a thermal conductivity of 72 W/m·K, were obtained.

As for the compositions of individual cBN sintered bodies, the products were identified by X-ray diffraction analysis, and the cBN content percentages were assayed by ICP analysis.

In the components other than the cBN component in the aforementioned cBN sintered body, the percentage of Al compound, the ratio of the sum M of the mole numbers of the 4a, 5a and 6a group elements with respect to the sum of the mole numbers of C and N, and M were quantified by inductively conducted plasma emission analysis (ICP analysis). The thermal conductivity was measured by a xenon flash thermal conductivity meter.

Cutting was evaluated under the conditions below with using tools having this cBN sintered body in the surface participating in cutting, and having a insert shape classified as ISO model No. CNGA120408.

For all of the inserts, the solid cBN sintered body material without carbide backing was brazed to a substrate made of carbide, then the cBN sintered body cutting face and the nose R part were processed by grinding, subsequently, the aforementioned types of cutting edge shapes were machined. The thickness of the cBN sintered body after the aforementioned cutting edge shape machining was 0.8 mm for all inserts, and the brazed area on the cBN sintered body material bottom surface of the inserts having a nose R of 0.8 R was 3.2 mm$^2$. The brazing had a composition of Ag: 76 wt %, Cu: 21 wt %, Zr: 1 wt %, and Ti: 2 wt %; and the brazing was conducted at 850° C. For all samples, the thickness of the brazing material in the brazing layer was 0.05 mm, and there were no vacancies in the brazing material.

For all inserts, after brazing the cBN sintered body on the various types of insert substrate as previously described, the cBN sintered body cutting face and the nose R part were processed by grinding, subsequently, further grinding was conducted to process the cutting edges of all the aforementioned inserts into a chamfered shape with an angle of −25° and a width of 0.13 mm; when installing the insert in the holder, the inclination angle, the side rake angle, the back relief angle, the side relief angle, the end cutting angle and the side cutting edge angle were −5°, −5°, 5°, 5°, 5° and −5°, respectively. Finally, after machining the aforementioned cutting edge shape, it was coated with a 1 μm thick of TiAlN heat resistant film having an atomic ratio of Al to Ti, Al/Ti, of 1 by arc ion plating PVD.

Workpiece to be cut: JIS model No. SUJ2 outer diameter turning machining (DIN model No. 100Cr6), continuous machining
Hardness of workpiece to be cut: HRc62
Cutting speed: V=120 m/min
Depth of cut: d=0.15 mm
Feed rate: f=0.08 mm/rev.
Cutting time: 80 min
Coolant: Emulsion (manufacturing source: Japan Fluid System, product name: System Cut 96) 20 times diluted As indicated in Table 3, in contrast to the affected layer by machining of 15 μm in the conventional cBN sintered body, the affected layers by processing in sample Nos. 38 to 51, which are cBN sintered body cutting tools of the present invention, were all 9 μm or less, and the residual stress added was high compression residual stress.

Particularly, it is demonstrated that: the cBN sintered body cutting tools of sample Nos. 40 to 43 and 47 to 51, in which in binder materials in the cBN sintered body including at least one selected from nitrides, carbides and carbonitrides of the

TABLE 3

| | cBN sintered body | | | | | | | |
|---|---|---|---|---|---|---|---|---|
| Smpl. No. *1 | cBN content percentage volume % | Binder material composition | $M/(C+N)$ of binder | Al content in binder material Wt % | Thermal conductivity $W/m \cdot K$ | Flank wear width VB μm *2 | Affected layer thickness by machining μm *4 | Residual stress GPa *5 |
| 37 | 72 | TiN, TiB$_2$, AlB$_2$, AlN, Al$_2$O$_3$ | 1.2 | 8 | 60 | 100 | 15 | 0.1 |
| 38 | 70 | Same as above | 1.4 | 8 | 79 | 95 | 5 | −4 |
| 39 | 72 | Same as above | 1.2 | 8 | 78 | 100 | 8 | −3.4 |
| 40 | 72 | Same as above | 1.3 | 8 | 82 | 100 | 4 | −4.5 |
| 41 | 72 | Same as above | 1.4 | 2 | 89 | 100 | 2 | −5 |
| 42 | 72 | Same as above | 1.4 | 8 | 88 | 100 | 3 | −4.5 |
| 43 | 72 | Same as above | 1.4 | 20 | 80 | 105 | 5 | −4 |
| 44 | 72 | Same as above | 1.4 | 25 | 73 | 105 | 9 | −3.2 |
| 45 | 72 | Same as above | 1.6 | 8 | 75 | 100 | 5 | −4 |
| 46 | 72 | Same as above | 1.8 | 8 | 72 | 100 | 8 | −3.6 |
| 47 | 72 | TiC, TiB$_2$, AlB$_2$, AlN, Al$_2$O$_3$ | 1.4 | 8 | 80 | 95 | 5 | −4 |
| 48 | 72 | TiN, ZrN, TiB$_2$, AlB$_2$, AlN, Al$_2$O$_3$ | 1.4 | 8 | 80 | 100 | 5 | −4 |
| 49 | 85 | TiC, HfC, TiB$_2$, AlB$_2$, AlN, Al$_2$O$_3$ | 1.4 | 8 | 82 | 110 | 4 | −4.6 |
| 50 | 90 | TiN, TiB$_2$, AlB$_2$, AlN, Al$_2$O$_3$ | 1.4 | 8 | 110 | 115 | 3 | −4.7 |
| 51 | 95 | Same as above | 1.4 | 8 | 120 | 120 | 2 | −5 |
| 52 | 99 | Same as above | 1.4 | 8 | 300 | 300 *3 | 25 | 1.5 |

*1 Sample No. 37 is the commercial insert used in sample No. 9 in Example 1.
*2 The measured values of the width of flank wear VB after 80 minutes of cutting time are represented.
*3 Only in sample No. 52, the width of flank wear VB reached 300 μm after 10 minutes of cutting time because the TiAlN heat resistant film peeled off, then, cutting was stopped and the thickness of the affected layer by machining and the residual stress were measured. For the other samples, the width of flank wear VB was measured at 80 minutes of cutting time, and the thickness of the affected layer by machining and the residual stress were measured at that time.
*4 Except for sample No. 52, after 80 minutes of cutting time, the thickness of the affected layer by machining was measured after lapping the cross-section of the machined surface and etching it with nital (ethanol + 5 wt % nitric acid).
*5 Except for sample No. 52, after 80 minutes of cutting time, the residual stress of the machined surface was measured by the sin2Ψ method (iso-inclination method) using a microregion X-ray stress analyzer. The minus sign in the Table indicates that compression stress was added, and a positive sign indicates that tension was applied.

4a, 5a, 6a group elements and an Al compound, the M/(C+M), the ratio of the sum M of the mole numbers of the 4a, 5a, and 6a group elements with respect to the sum of the mole numbers of C and N, was not less than 1.3 and not more than 1.6, the percentage of Al compound was 20% or less, and thermal conductivities were 80 W/m·K or more, achieved higher grade surface integrity.

When the M/(C+N) is less than 1.3, the bonding force among the cBN particles and the binder is insufficient, microdefects are prone to appear at the grain boundary regions, these defective regions become thermal barriers, then, thermal conductivity is reduced. When exceeding 1.6, the thermal conductivity is also reduced, and the reason is understood to be that the phonon conductivity is reduced because the harmonic vibration in the crystal lattice constituting the binder is disturbed by the influence of micro-precipitates or solid solution in the binder materials.

Sample No. 52 had a good thermal conductivity similarly to the cBN sintered body cutting tools of the present invention. Consequently, high surface integrity would be obtainable in cutting hardened steel if it is possible to suppress the development of excess flank wear VB, which is a weakness of cBN sintered body cutting tools with a high cBN content percentage. However, a cBN sintered body in which the cBN content percentage exceeds 95% by volume could not obtain the high grade surface properties like the present invention, because: it involves small proportion of the binder materials having electroconductivity comparing to cBN particles, which do not have electroconductivity; the bonding strength between cBN sintered body and the heat resistant film formed by arc ion plating PVD is not sufficient to hold up to cutting the workpiece after heat treatment; the heat resistant film peels off in the early period of cutting; then the width of flank wear increases.

EXAMPLE 4

Taking a commercial hBN and a melamine resin powder as the starting materials, and using metal catalysts of MgBN and LiCaBN containing slight amount of Al and Si, the high purity cBN powder displayed in Table 4 with an average particle diameter of 2 to 5 μm, and a Li, Si, Mg, Al, Ca and carbon with respect to cBN composition of 0.222% or less by weight was synthesized.

The amount of Li, Ca, Al, Si and Mg mixed into the cBN component was controlled by the amount of MgBN and LiCaBN metal catalysts containing slight amount of Al and Si added. And, the amount of carbon mixed in was controlled by adjusting the preprocessing temperature of the aforementioned hBN starting material from 1,100° C. to 1,500° C. in a hydrogen gas atmosphere using a high frequency furnace.

A binder powder for this was made by mixing together 82 wt % of TiN, and 8 wt % of Al. The high purity cBN powder and the binder were mixed using a pot and ball made of carbide.

This mixed powder was filled into a container made of carbide, and sintered at a pressure of 8.0 GPa and a temperature of 1,700° C. for 30 minutes. When performing X-ray diffraction analysis on the sintered body, TiN, $TiB_2$, AlN, $Al_2O_3$, etc. except for cBN were identified in every sample. In the results of ICP analysis of the cBN sintered bodies, the cBN content percentage by volume was 72% in all samples except sample No. 54, and the TiN is characterized in that the mole ratio of Ti to N was 1.4. The cBN content percentage and the mole ratio of Ti to N were assayed by ICP analysis, and the thermal conductivity of the cBN sintered bodies was measured by a xenon flash thermal conductivity meter.

The individual cBN sintered bodies are shown in Table 4. For the amount of oxygen and the amount of Li, Ca, Al, Si, Mg, and carbon with respect to the cBN component in the sintered body, a rectangular piece of the sintered body 3 to 7 mm per side with a thickness of 0.3 to 0.5 mm was treated in a tightly sealed container at 120° C. or more and less than 150° C. for 48 hours with hydrofluoric nitric acid, in which 40 mL of a doubly diluted nitric acid with a concentration of 60% or more and less than 65% was mixed with 10 mL of hydrofluoric acid with a concentration of 45% or more and less than 50%; and the residue components were assayed by the aforementioned ICP method. When conducting X-ray diffraction analysis on this residue, no TiN, $TiB_2$, AlN, or $Al_2O_3$ was identified in the residue of any sample.

Next, the sintered bodies obtained, cutting was evaluated using tools having, in the surface participating in cutting, the cBN sintered bodies with the different compositions displayed in 53 to 67 in Table 4, and having a insert shape classified as ISO model No. CNGA120412, under the conditions below.

For all of the inserts, the solid cBN sintered body material without carbide backing was brazed to a substrate made of carbide, then the cBN sintered body cutting face and the nose R part were processed by grinding, and subsequently, the aforementioned types of cutting edge shapes were machined. The thickness of the cBN sintered body after the aforementioned cutting edge shape machining was 0.8 mm for all inserts, and the brazed area on the cBN sintered body material bottom surface of the inserts having a nose R of 1.2 R was 2.9 $mm^2$. The brazing had a composition of Ag: 76 wt %, Cu: 21 wt %, Zr: 1 wt %, and Ti: 2 wt %; and the brazing was conducted at 850° C. For all samples, the thickness of the brazing material in the brazing layer was 0.05 mm, and there were no vacancies in the brazing material.

For all inserts, after brazing the cBN sintered body on the various types of insert substrate as previously described, the cBN sintered body cutting face and the nose R part were processed by grinding. Subsequently, further grinding was conducted to process the cutting edges of all the aforementioned inserts into a chamfered shape with an angle of −25° and a width of 0.13 mm; when installing the insert in the holder, the inclination angle, the side rake angle, the back relief angle, the side relief angle, the end cutting angle, and the side cutting edge angle were −5°, −5°, 5°, 5°, 5° and −5°, respectively. Finally, after machining the aforementioned cutting edge preparation, it was coated with a 1 μm thick TiAlN heat resistant film having an atomic ratio of Al to Ti, Al/Ti, of 1 by arc ion plating PVD.

Workpiece to be cut: JIS model No. SCR415 outer diameter turning machining (DIN model No. 15Cr3), continuous machining Hardness of workpiece to be cut: HRc58

Cutting speed: V=120 m/min

Depth of cut: d=0.15 mm

Feed rate: f=0.08 mm/rev.

Cutting time: 60 min

Coolant: None

TABLE 4

| Smpl. No. *1 | hBN pre-heat treatment temperature °C. | Percentages elements occupying in cBN component wt % | | | | CBN sintered body | | Flank | | Affected layer |
|---|---|---|---|---|---|---|---|---|---|---|
| | | Amount of oxygen | Carbon | Sum of Li, Mg, Si, Al, Ca | Sum of Li, Mg, Si, Al, Ca, carbon *2 | cBN particle diameter μm | Thermal conductivity W/m·K | wear width VB μm *3 | Surface roughness Rz *4 | thickness by Machining μm *5 |
| 53 | — | 0.2 | 0.13 | 0.22 | 0.35 | 3 | 60 | 85 | 1.8 | 15 |
| 54 | — | 0.2 | 0.13 | 0.22 | 0.35 | 3 | 76 | 85 | 1.8 | 5 |
| 55 | None | 0.2 | 0.13 | 0.09 | 0.21 | 3 | 78 | 85 | 1.8 | 5 |
| 56 | 1,100 | 0.17 | 0.02 | 0.05 | 0.07 | 3 | 85 | 85 | 1.8 | 2.8 |
| 57 | 1,250 | 0.15 | 0.05 | 0.05 | 0.1 | 3 | 89 | 85 | 1.8 | 2.5 |
| 58 | 1,500 | 0.12 | 0.01 | 0.05 | 0.06 | 3 | 92 | 85 | 1.8 | 2.2 |
| 59 | 1,500 | 0.13 | 0.01 | 0.05 | 0.06 | 1 | 70 | 85 | 1.8 | 8 |
| 60 | 1,500 | 0.14 | 0.007 | 0.05 | 0.057 | 2 | 88 | 85 | 1.6 | 2.5 |
| 61 | 1,500 | 0.12 | 0.002 | 0.01 | 0.012 | 3 | 72 | 85 | 1.8 | 6 |
| 62 | 1,500 | 0.12 | 0.003 | 0.017 | 0.02 | 3 | 92 | 85 | 1.8 | 2.2 |
| 63 | 1,500 | 0.12 | 0.002 | 0.01 | 0.102 | 3 | 87 | 85 | 1.8 | 2.8 |
| 64 | 1,500 | 0.12 | 0.003 | 0.017 | 0.2 | 3 | 85 | 85 | 1.8 | 3.5 |
| 65 | 1,500 | 0.12 | 0.002 | 0.22 | 0.222 | 3 | 78 | 85 | 2.2 | 5 |
| 66 | 1,500 | 0.12 | 0.001 | 0.05 | 0.051 | 4 | 92 | 90 | 2.4 | 2.2 |
| 67 | 1,500 | 0.11 | 0.001 | 0.05 | 0.051 | 5 | 95 | 95 | 4 | 2.2 |

*1 Sample No. 53 is the commercial insert used in sample No. 9 in Example 1 having a commercial cBN powder as the starting material. Sample No. 54 is a cBN sintered body of the present invention used in sample No. 24 in Example 1 taking a commercial cBN powder source material as the starting material. Sample Nos. 55 to 67 are cBN sintered bodies of the present invention using a cBN powder synthesized from a hBN powder.
*2 This represents the sum of elements excluding oxygen, such as Li, Ca, Al, Si, Mg and carbon in wt %, which are encompassed in the cBN component in this sintered body, as the ratio occupied in the cBN component.
*3 The measured values of the width of flank wear after 60 minutes of cutting time are represented.
*4 The surface roughness Rz is ten point average roughness as stipulated in JIS B0601 and it was measured in the axial direction of the cut material under the conditions of cut off 0.8 μm, and standard length l = 4 mm.
*5 After 60 minutes of cutting time, the thickness of the affected layer by machining was measured after lapping the cross-section of the machined surface and etching it with nital (ethanol + 5 wt % nitric acid).

As shown in Table 4, in contrast to the thickness of affected layer by machining produced in the conventional cBN sintered body of 15 μm, sample Nos. 54 to 67, which are cBN sintered body cutting tools of the present invention, controlled the amount of affected layer by machining produced to 8 μm or less.

Among the samples of the present invention, sample Nos. 56 to 58, 60, 62 to 64, and 66 comprised high purity cBN components in which: the cBN average particle diameter constituting the cBN sintered body was not less than 2 μm and not more than 4 μm; carbon, oxygen and at least one selected from Li, Si, Al, Ca, Mg were included in the cBN composition; the sum of the aforementioned Li, Si, Al, Ca, Mg, and carbon with respect to the cBN component was not less than 0.02% and not more than 0.2% by wt %; and the amount of oxygen with respect to the cBN component was 0.17% or less by wt %. Among the cBN sintered body cutting tools of the present invention, they had superior thermal conductivity, and the thickness of affected layer by machining produced was restricted to 3.5 μm or less. The reason is supposed to be that the phonon conductivity has been improved because the Li, Si, Al, Ca, Mg, and carbon components in the cBN particles that obstruct the harmonic vibration of the cBN crystal lattice decreased.

It is understood that among the samples of the present invention, thermal conductivity is lower in sample Nos. 53, 54 and 65, in which Li, Si, Al, Ca, Mg and carbon components in the cBN particle exceed 0.2%, because the aforementioned harmonic vibration is obstructed.

Conversely, the thermal conductivity is lower in sample No. 61, in which the Li, Si, Al, Ca, Mg and carbon components in the cBN particles are less than 0.02% by wt %. The reason is supposed to be that defects forming thermal barriers are formed inside the cBN sintered body because the effect of increasing the bonding strength between cBN particles disappears if there are too few Li, Si, Al, Ca, Mg, and carbon components.

The thermal conductivity of the sample No. 59 is also lower. The cBN particle size is very fine, then the reason is supposed to be that the increase of the particle boundary surface area of the cBN particles, which becomes a thermal barrier.

Meanwhile, because the cBN particle diameter in sample No. 67 is large, it appears that the particle boundary area, which is a thermal barrier, decreased, the thermal conductivity was improved, and the thickness of affected layer by machining produced was small. However, the surface roughness was a poor Rz 4.0 μm in contrast to the other samples that achieved satisfactory surface roughness of Rz 2.4 μm or less. By observing the insert cutting edge already evaluated, in all samples, the dropout of cBN particles was observed in the end cutting edge part of tool, and the roughness is caused by the marks left from these dropped out particles that were transferred to the machined surface and that determined the surface roughness.

EXAMPLE 5

The cBN sintered bodies shown in 68 to 75 of Table 5 were obtained by enclosing the mixed powder of cBN powder and binder material powder used in sample No. 58 of Example 4 in a Ti capsule, vacuum sealing the capsule in a container made of carbide, denitriding it at 3 to 3.5 GPa and a temperature of 1,000° C. to 1,200° C., and then sintering at a pressure of 7.7 GPa, a temperature of 2,000° C. for 60 minutes.

When conducting X-ray diffraction analysis on the sintered body, TiN, TiB$_2$, AlN, Al$_2$O$_3$, etc. except cBN component were identified in every sample. In the results of ICP analysis of the cBN sintered body, the cBN content percentage by volume was 72% in all samples except sample No. 2, and the TiN is characterized in that the mole ratio of Ti to N was 1.4.

For the mol ratio of B to N of the cBN component in this sintered body, a rectangular piece of the sintered body having 3 to 7 mm per side and a thickness of 0.3 to 0.5 mm was treated in a tightly sealed container at 120° C. or more and less than 150° C. for 48 hours with hydrofluoric nitric acid, in which 40 mL of a doubly diluted nitric acid of a concentration of 60% or more and less than 65% was mixed with 10 mL of hydrofluoric acid with a concentration of 45% or more and less than 50%; and the residue components were assayed by the aforementioned ICP method. When conducting X-ray diffraction analysis on the residue, no TiN, $TiB_2$, AlN, or $Al_2O_3$ was identified in the residue of any sample.

Next, cutting was evaluated for the sintered bodies obtained under the same conditions as in Example 4, using tools having the cBN sintered bodies with the different compositions displayed in 68 to 75 in Table 5 participating in cutting, and having a insert shape classified as ISO model No. CNGA120412.

For all of the inserts, the solid cBN sintered body material without carbide backing was brazed to a substrate made of carbide, then the cBN sintered body cutting face and the nose R part were processed by grinding, and subsequently, the aforementioned types of cutting edge preparation were machined. The thickness of the cBN sintered body after the aforementioned cutting edge shape machining was 0.8 mm for all inserts, and the brazed area on the cBN sintered body material bottom surface of the inserts having a nose R of 1.2 R was 2.9 mm². The brazing had a composition of Ag: 76 wt %, Cu: 21 wt %, Zr: 1 wt % and Ti: 2 wt %; and the brazing was conducted at 850° C. For all samples, the thickness of the brazing material in the brazing layer was 0.05 mm, and there were no vacancies in the brazing material.

For all inserts, after brazing the cBN sintered body on the various types of insert substrate as previously described, the cBN sintered body cutting face and the nose R part were processed by grinding. Subsequently, further grinding was conducted to process the cutting edges of all the aforementioned inserts into a chamfered shape with an angle of −25° and a width of 0.13 mm; when installing the insert in the holder, the inclination angle, the side rake angle, the back relief angle, the side relief angle, the end cutting angle, and the side cutting edge angle were −5°, −5°, 5°, 5°, 5° and −5°, respectively. Finally, after machining the aforementioned cutting edge shape, it was coated with a 1 μm thick TiAlN heat resistant film having an atomic ratio of Al to Ti, Al/Ti, of 1 by arc ion plating PVD.

TABLE 5

| Smpl. No. | Denitriding process conditions | | cBN components Mol | cBN sintered body Thermal | Flank wear width | Affected layer thickness by | Residual |
| --- | --- | --- | --- | --- | --- | --- | --- |
| | Pressure GPa | Temperature °C. | ratio of B to N | conductivity W/m·K | VB *1 μm | machining *2 μm | stress *3 GPa |
| 68 | None | None | 1.05 | 92 | 85 | 2.2 | −5.5 |
| 69 | 3 | 1,000 | 1.08 | 92 | 86 | 2.2 | −5.5 |
| 70 | 3 | 1,100 | 1.12 | 91 | 87 | 2.2 | −5 |
| 71 | 3 | 1,200 | 1.15 | 91 | 88 | 1.9 | −6 |
| 72 | 3.3 | 1,000 | 1.15 | 91 | 88 | 1.9 | −6 |
| 73 | 3.5 | 1,000 | 1.17 | 90 | 90 | 1.5 | −6.5 |
| 74 | 3.5 | 1,100 | 1.2 | 88 | 92 | 1.7 | −6.2 |
| 75 | 3.5 | 1,200 | 1.25 | 80 | 105 | 3.5 | −4.8 |

*1 The measured values of the width of flank wear after 60 minutes of cutting time are represented.
*2 After 60 minutes of cutting time, the thickness of the affected layer by machining was measured after lapping the cross-section of the machined surface and etching it with nital (ethanol + 5 wt % nitric acid).
*3 After 5 minutes of cutting, the residual stress of the machined surface was measured by the $\sin2\Psi$ method (iso-inclination method) using a microregion X-ray stress analyzer. The minus sign in the Table indicates that compression stress was added.

As shown in Table 5, sample Nos. 68 to 75 are the cBN sintered body cutting tools of the present invention, and the thickness of affected layer by machining produced was restricted to less than 3.5 μm in all samples. Sample Nos. 71 to 74, in which the mole ratio of B to N in the cBN component forming the cBN sintered body was not less than 1.15 and not more than 1.2, controlled the thickness of affected layer by machining produced to 1.9 μm or less, and high compression stress remained.

In sample Nos. 68 to 75, irrespective of a slight drop in thermal conductivity related to the increase of B/N ratio, high grade surface integrity were obtained. It is understood that this is because the stoichiometry of the B and N in the cBN composition deviated to a composition with a surplus of B, then, $B_2O_3$, which is superior in lubrication characteristic, was produced in the frictional part of the machined object and the frictional heat decreased.

Meanwhile, sample No. 75, in which the 1.25 mole ratio of B to N in the cBN component exceeded 1.20, diminished the characteristics about the thickness of affected layer by machining produced and the residual stress characteristics. It is understood for the reason that the presence of an excessive B component not participating in the atomic bonding among the cBN lattice lowered the wear resistance, and disturbed the harmonic vibration.

EXAMPLE 6 cBN sintered body material having an carbide backing used in sample 28 of Example 2 was brazed to an carbide substrate at 700° C. to 1,000° C. in a vacuum atmosphere using 3 types of brazing material, and shown in Table 6 are the various types of cBN sintered body cutting tools with the same insert shape, cutting edge processing, and heat resistant film coating as in Example 2.

Sample Nos. 76 to 93 used a brazing material having a composition of Ag: 76%, Cu: 23%, and Ti: 1% by weight, or this brazing material in which cBN, diamond, WC, or W with an average particle diameter of 5 to 200 μm was distributed.

Sample No. 94 used a brazing material having a composition of Ag: 70%, Cu: 29% and Ti: 1% by weight; and Sample No. 95 used a brazing material having a composition of Ag: 65%, Cu: 32%, Ti: 2% and Zr: 1% by weight.

The periphery of the brazing material part was removed by grinding to make the brazing material part be a single unit, and then the thermal conductivity of the brazing material part was measured using a xenon flash thermal conductivity meter.

After the aforementioned machining to process the cutting edge of the tool as in Example 2, the cutting edge was coated with a 1 μm thick TiAlN heat resistant film having an atomic ratio of Al to Ti, Al/Ti, of 1 by arc ion plating PVD. The production of affected layer by machining was evaluated under the same cutting conditions as in Example 2.

single body. It is supposed that in sample No. 76, which was brazed at a low temperature, the melting of the brazing material and the wetting between the cBN sintered body material and the carbide substrate were insufficient, and vacancies of 0.6 mm or more in which brazing material did not penetrate were formed, and therefore these vacancies worked as a heat barrier, and the thermal conductivity was significantly reduced.

Meanwhile, in sample No. 82, the brazing material was sufficiently melted, but the temperature was excessively high. Therefore, it is understood that the viscosity of the melted brazing material lowered, the brazing material flowed out from the surface boundary between the cBN sintered body material and the carbide substrate, and large vacancies of 0.8 mm were formed.

TABLE 6

| | Brazing material part | | | | | | | Flank | Affected layer | |
|---|---|---|---|---|---|---|---|---|---|---|
| | Materials added to brazing material | | | | | Major | | | | |
| Smpl. No. | Type of particle | Average particle diameter μm | Content percent Volume % | Brazed temperature °C. | Thickness μm | diameter of vacancy mm | Thermal conductivity W/m·K | wear width VB μm *1 | thickness by machining μm *2 | Residual stress GPa *3 |
| 76 | — | — | — | 700 | 0.3 | 0.6 | 80 | 105 | 2 | −5 |
| 77 | — | — | — | 750 | 0.2 | 0.5 | 150 | 104 | 1.5 | −5.2 |
| 78 | — | — | — | 800 | 0.1 | 0.3 | 240 | 102 | 1.2 | −5.5 |
| 79 | — | — | — | 850 | 0.05 | 0 | 250 | 102 | 0.9 | −5.6 |
| 80 | — | — | — | 900 | 0.03 | 0.4 | 230 | 102 | 1.2 | −5.5 |
| 81 | — | — | — | 950 | 0.02 | 0.5 | 220 | 102 | 1.3 | −5.4 |
| 82 | — | — | — | 1,000 | 0.02 | 0.8 | 80 | 105 | 2 | −5 |
| 83 | Dia | 2 | 40 | 850 | 0.04 | 0.4 | 260 | 102 | 1.2 | −5.7 |
| 84 | Dia | 5 | 40 | 850 | 0.06 | 0.3 | 300 | 101 | 0.7 | −6.1 |
| 85 | Dia | 20 | 5 | 850 | 0.1 | 0.3 | 280 | 102 | 0.8 | −6 |
| 86 | Dia | 20 | 15 | 850 | 0.1 | 0.3 | 300 | 101 | 0.7 | −6.1 |
| 87 | Dia | 20 | 40 | 850 | 0.1 | 0.3 | 320 | 101 | 0.6 | −6.2 |
| 88 | Dia | 20 | 50 | 850 | 0.1 | 0.7 | 100 | 105 | 1.9 | −5.1 |
| 89 | Dia | 150 | 40 | 850 | 0.2 | 0.7 | 100 | 105 | 1.9 | −5.1 |
| 90 | Dia | 200 | 40 | 850 | 0.25 | 0.6 | 80 | 105 | 2 | −5 |
| 91 | cBN | 20 | 40 | 850 | 0.1 | 0.1 | 350 | 100 | 0.5 | −7 |
| 92 | WC | 20 | 40 | 850 | 0.1 | 0.5 | 260 | 102 | 0.9 | −5.8 |
| 93 | W | 20 | 40 | 850 | 0.1 | 0.5 | 260 | 102 | 0.9 | −5.8 |
| 94 | — | — | — | 850 | 0.05 | 0 | 220 | 102 | 1.3 | −5.5 |
| 95 | — | — | — | 850 | 0.05 | 0 | 150 | 104 | 1.5 | −5.2 |

*1 The measured values of the width of flank wear VB after 150 minutes of cutting time are represented.
*2 After 150 minutes of cutting time, the thickness of the affected layer by machining was measured after lapping the cross-section of the machined surface and etching it with nital (ethanol + 5 wt % nitric acid).
*3 After 150 minutes of cutting time, the residual stress of the machined surface was measured by the sin2Ψ method (iso-inclination method) using a microregion X-ray stress analyzer. The minus sign in the Table indicates that compression stress was added.

As shown in Table 6, the samples indicated by sample Nos. 76 to 95 are the cBN sintered body cutting tools of the present invention. In particular, as indicated in sample Nos. 78 to 81 and 94, tools, which comprised a brazing material having a thermal conductivity of 220 W/m·K or more, a brazing layer thickness of not less than 0.02 mm and not more than 0.2 mm, and containing no vacancies having a major diameter exceeding 0.5 mm within the brazing layer, produced less affected layer by machining and exhibited a high residual compression stress value.

The cBN sintered body cutting tools of the present invention in sample Nos. 84 to 87 and 91, which contained 5 to 40% by volume of cBN or diamond particles having an average particle diameter of 5 to 150 μm or less inside the brazing layer, and which had a thermal conductivity of 280 W/m·K or more, produced less affected layer by machining and exhibited a high residual compression stress value.

Sample Nos. 76 to 82 used a brazing material having a thermal conductivity of 250 W/m·K as a brazing material As for samples of Nos. 83 to 92, hardened particles superior in thermal conductivity and Young's modulus were distributed in the brazing material part for the objective of reducing the cutting edge temperature of the cBN sintered body part during cutting. But, as the samples of sample Nos. 88 to 90, when the particle diameter was too large or the amount added to the brazing material was too great and brazing material penetration was insufficient, to the contrary, vacant defects were produced and the surface characteristics of the machined surface were not improved.

It appears that the type of hardened particles affected the wettability with the brazing material, and the cBN particles, which have less thermal conductivity than diamond particles as a hard particle single body, had superior wettability with the brazing material. Then, sample No. 91, in which cBN particles were distributed in the brazing material, was notably superior.

EXAMPLE 7

Tools having the insert shape classified by ISO model No. CNGA120408 and having the cBN sintered material of the present invention used in sample 29 of Example 2 in the surface participating in cutting were prepared, the cBN sintered body cutting tools indicated in Table 7 which were coated with various heat resistant films to a thickness of 1 μm by arc ion plating PVD were manufactured, and cutting was evaluated under the following conditions.

At that time, for all of the inserts as in Example 2, the cBN sintered body material with an carbide backing was joined using various brazing materials to a substrate made of carbide, then the cBN sintered body cutting face and the nose R part were processed by grinding, and subsequently, the aforementioned types of cutting edge shapes were machined. The thickness of the cBN sintered body and the carbide backing prior to the aforementioned cutting edge shape machining was 0.8 mm for all tools, and the brazed area on the cBN sintered body material bottom surface of the inserts having a nose R of 0.8 R was 3.2 mm². The brazing was conducted at 850° C. in a vacuum atmosphere using a brazing material of a composition of Ag: 76%, Cu: 23% and Ti: 1% by weight.

For all samples, the thickness of the brazing material in the brazing layer was 0.05 mm, and there were no vacancies in the brazing material part.

For all inserts, after brazing the cBN sintered body on the individual types of insert substrate as previously described, the cBN sintered body cutting face and the nose R part were processed by grinding. Subsequently, further grinding was conducted to process the cutting edges of all the aforementioned inserts into a chamfered shape with an angle of −25° and a width of 0.13 mm; when installing the insert in the holder, the inclination angle, the side rake angle, the back relief angle, the side relief angle, the end cutting angle, and the side cutting edge angle were −5°, −5°, 5°, 5°, 5° and −5°, respectively.

As to the thermal conductivity of the heat resistant film, the heat resistant film was formed on an SUS304 plate to a thickness of 15 μm, and the film was measured by a xenon flash conductivity meter.

Cutting was evaluated under the following conditions.

Workpiece to be cut: JIS model No. S55C outer diameter turning machining (DIN model No. C55), continuous machining
Hardness of workpiece to be cut: HRc45
Cutting speed: V=150 m/min
Depth of cut: d=0.2 mm
Feed rate: f=0.1 mm/rev.
Cutting time: 150 min
Coolant: None

TABLE 7

| Smpl. No. | Heat resistant film Composition | at % of Ti, Cr, Zr, V, Al | at % of C, N, O | Thermal conductivity W/m · K | Flank wear width VB μm *1 | Crater wear depth KT μm *2 | Affected layer thickness by machining μm *3 |
|---|---|---|---|---|---|---|---|
| 96 | None | — | — | — | 200 | 80 | Chipped at 105 min |
| 97 | Al$_2$O$_3$ | — | — | 20 | 100 | 15 | 21 |
| 98 | TiCN | Ti: 100 | C:N = 50:50 | 25 | 100 | 17 | 11 |
| 99 | TiN | Ti: 100 | — | 29 | 150 | 20 | 12 |
| 100 | TiZrN | Ti:Zr = 90:10 | — | 30 | 130 | 20 | 8 |
| 101 | TiAlCN | Ti:Al = 50:50 | C:N = 50:50 | 25 | 100 | 20 | 15 |
| 102 | TiAlN | Ti:Al = 30:70 | — | 50 | 85 | 70 | Chipped at 120 min |
| 103 | TiAlN | Ti:Al = 50:50 | — | 47 | 90 | 65 | Chipped at 130 min |
| 104 | TiAlN | Ti:Al = 85:15 | — | 42 | 100 | 50 | 5 |
| 105 | TiAlN | Ti:Al = 90:10 | — | 40 | 110 | 40 | 5 |
| 106 | TiAlN | Ti:Al = 95:5 | — | 35 | 120 | 25 | 4 |
| 107 | TiAlVN | Ti:Al:V = 91:5: | — | 35 | 120 | 15 | 3 |
| 108 | TiAlVCNO | Ti:Al:V = 91:5: | C:N = 48:48 | 30 | 120 | 14 | 3 |
| 109 | TiAlVN | Ti:Al:V = 85:1 | — | 33 | 110 | 13 | 3 |
| 110 | TiAlVZrSiN | Ti:Al:V:Zr:Si = 88:5:2:4:1 | — | 32 | 115 | 12 | 2 |
| 111 | CrAlN | Cr:Al = 30:70 | — | 50 | 95 | 75 | Chipped at 107 min |
| 112 | CrAlN | Cr:Al = 50:50 | — | 47 | 110 | 70 | Chipped at 110 min |
| 113 | CrAlN | Cr:Al = 85:15 | — | 45 | 130 | 55 | 9 |
| 114 | CrAlN | Cr:Al = 95:5 | — | 40 | 140 | 50 | 8 |
| 115 | ZrAlN | Zr:Al = 95:5 | — | 35 | 120 | 30 | 4 |

*1 The measured values of the width of flank wear VB after 100 minutes of cutting time are represented.
*2 The measured values of the depth of KT wear after 100 minutes of cutting time are represented.
*3 After 150 minutes of cutting time, the thickness of the affected layer by machining was measured after lapping the cross-section of the machined surface and etching it with nital (ethanol + 5 wt % nitric acid).

As shown in Table 7, the samples indicated by sample Nos. 96 to 115 were cBN sintered body cutting tools of the present invention. In particular, as indicated by sample Nos. 100, 104 to 110 and 113 to 115, the cBN sintered body cutting tools of the present invention having a heat resistant film with a thermal conductivity of not less than 30 W/m·K and not more than 45 W/m·K produced a little affected layer by processing of 8 μm or less, and had a long lifetime. The thermal conductivities of the heat resistant films of sample Nos. 96 to 99 and 101 were 29 W/m·K or less, and the thickness of affected layer by machining produced was 11 μm or more because flowing the cutting heat generated on the machined surface into the cBN sintered body cutting tool of the present invention was disturbed.

Meanwhile, sample Nos. 102, 103, 111 and 112, which had thermal conductivities of 47 W/m·K or more, chipped due to the development of crater wear, because the cutting heat generated at the machined surface flowed aggressively into the cBN sintered body cutting tools of the present invention.

EXAMPLE 8

Tools having the insert shape classified by ISO model No. CNGA120408 and having the cBN sintered body material of the present invention used in sample 109 of Example 7 in the surface participating in cutting were prepared.

For all of the inserts, the solid cBN sintered body material without carbide backing was brazed to a substrate made of carbide, then the cBN sintered body cutting face and the nose R part were processed by grinding, and subsequently, the aforementioned types of cutting edge preparation were machined. The thickness of the cBN sintered body after the aforementioned cutting edge shape machining was 0.8 mm for all inserts, and the brazed area on the cBN sintered body material bottom surface of the inserts having a nose R of 0.8 R was 3.2 mm². The brazing had a composition of Ag: 76 wt %, Cu: 21 wt %, Zr: 1 wt % and Ti: 2 wt %; and the brazing was conducted at 850° C. For all samples, the thickness of the brazing material in the brazing layer was 0.05 mm, and there were no vacancies in the brazing material.

For all inserts, after brazing the cBN sintered body on the individual types of insert substrate as previously described, the cBN sintered body cutting face and the nose R part were processed by grinding. Subsequently, further grinding was conducted to process the cutting edge of all the aforementioned inserts into a chamfered shape with an angle of −25° and a width of 0.13 mm; when installing the insert in the holder, the inclination angle, the side rake angle, the back relief angle, the side relief angle, the end cutting angle, and the side cutting edge angle were −5°, −5°, 5°, 5°, 5° and −5°, respectively.

Next, in the same way as the cBN sintered body tool of the present invention of sample No. 109 in Example 7, after machining the aforementioned cutting edge preparation, the cutting edge was coated with a 1 μm thick TiAlVN heat resistant film in which the percentages of Ti, Al, and V at 85 at %, 10 at % and 5 at %, respectively, by arc ion plating PVD.

Finally, the 18 types of samples shown in Table 8 were manufactured by removing, in the portion participating in cutting, a region of the heat resistant film having an area of not less than 0% and not more than 80% with respect to the cutting cross-sectional area Q defined by $$Q=\{R^2 \cdot \tan^{-1} [f/\text{sqr}(4R^2-f^2)] + 0.25 f \cdot \text{sqr}(4R^2-f^2) + f(d-R)\}/(\cos \alpha s \cdot \cos \alpha b),$$

with assuming nose R, depth of cut d, feed rate f, side rake angle αb, and inclination angle αs. Cutting of these samples was evaluated using various types of coolants under the following conditions.

Workpiece to be cut: JIS model No. SCM420 outer diameter turning machining (DIN model No. 25CrMo4), continuous machining Hardness of workpiece to be cut: HRc58
Cutting speed: V=120 m/min
Depth of cut: d=0.2 mm
Feed rate: f=0.1 mm/rev.
Cutting time: 80 min
Coolant:
(1) Emulsion (manufacturing source: Japan Fluid System, product name: System Cut 96)
(2) Oil mist (manufacturing source: Fuji BC Engineering, product name: Bluebe LB-1)

TABLE 8

| Smpl. No. | Ratio of the area of heat resistant film removed to the cutting cross-sectional area Q | | Coolant | VB *1 μm | KT *2 μm | Affected layer thickness by machining *3 μm | Residual stress GPa |
| --- | --- | --- | --- | --- | --- | --- | --- |
| | Flank face | Rake face | | | | | |
| 116 | Not coated with heat resistant film | Not coated with heat resistant film | None | 200 | 70 | Chipped at 65 min | Chipped at 65 min |
| 117 | 0 | 0 | None | 70 | 15 | 7 | −5 |
| 118 | 10 | 0 | None | 72 | 15 | 5 | −5.5 |
| 119 | 20 | 0 | None | 75 | 15 | 4 | −6 |
| 120 | 40 | 0 | None | 85 | 15 | 3 | −6.2 |
| 121 | 80 | 0 | None | 95 | 15 | 2 | −6.5 |
| 122 | 100 | 0 | None | 105 | 15 | 6 | −5 |
| 123 | 0 | 10 | None | 70 | 20 | 5 | −5.5 |
| 124 | 0 | 20 | None | 70 | 30 | 4 | −6 |
| 125 | 0 | 40 | None | 70 | 35 | 4 | −6 |
| 126 | 0 | 80 | None | 70 | 40 | 4 | −6 |
| 127 | 0 | 100 | None | 70 | 70 | Chipped at 70 min | Chipped at 70 min |
| 128 | 40 | 40 | None | 85 | 35 | 4 | −6 |

TABLE 8-continued

| Smpl. No. | Ratio of the area of heat resistant film removed to the cutting cross-sectional area Q | | Coolant | VB *1 μm | KT *2 μm | Affected layer thickness by machining *3 μm | Residual stress GPa |
|---|---|---|---|---|---|---|---|
| | Flank face | Rake face | | | | | |
| 129 | 40 | 40 | Emulsion 20 times diluted | 85 | 33 | 3 | −6.5 |
| 130 | 40 | 40 | Oil mist 0.5 cc/hour | 85 | 34 | 4 | −6 |
| 131 | 40 | 40 | Oil mist 1 cc/hour | 85 | 34 | 2 | −6.7 |
| 132 | 40 | 40 | Oil mist 10 cc/hour | 85 | 34 | 1.5 | −6.8 |
| 133 | 40 | 40 | Oil mist 300 cc/hour | 85 | 34 | 0.8 | −7 |
| 134 | 40 | 40 | Oil mist 350 cc/hour | 85 | 34 | 3 | −6.5 |

*1 The measured values of the width of flank wear VB after 60 minutes of cutting time are represented.
*2 The measured values of the depth of crater wear KT after 60 minutes of cutting time are represented.
*3 After 80 minutes of cutting time, the thickness of the affected layer by machining was measured after lapping the cross-section of the machined surface and etching it with nital (ethanol + 5 wt % nitric acid).
*4 After 80 minutes of cutting time, the residual stress of the machined surface was measured by the sin2Ψ method (iso-inclination method) using a microregion X-ray stress analyzer. The minus sign in the Table indicates that compression stress was added.

As shown in Table 8, the samples indicated by sample Nos. 116 to 134 were cBN sintered body cutting tools of the present invention. In particular, as indicated by sample Nos. 118 to 121, 123 to 126, and 128 to 134, in which an area of not less than 0% and not more than 80% of the heat resistant film in the tool flank or tool rake face with respect to the cutting cross-sectional area Q defined by $$Q=\{R^2 \cdot \tan^{-1}[f/\text{sqr}(4R^2-f^2)]+0.25f \cdot \text{sqr}(4R^2-f^2)+f(d-R)\}/(\cos \alpha s \cdot \cos \alpha b)$$

was removed, all produced less affected layer by machining and had a higher residual compression stress value than the cBN sintered body cutting tools of the present invention in which the heat resistant film was not removed. It is understood that this is because the cutting heat generated at the machined surface is effectively released as the machined surface directly scrapes against the cBN sintered body material of the present invention, which has greatly superior thermal conductivity than the heat resistant film.

Among the aforementioned cBN sintered body cutting tools of the invention with part of the heat resistant film removed, in particular, the cBN sintered body cutting tools of the invention with part of the heat resistant film removed from the flank face exhibited longer lifetime than the cBN sintered body cutting tools of the invention with part of the heat resistant film removed from the rake face.

The cBN sintered body cutting tools of this invention with heat resistant film removed from the rake face had a shorter lifespan until chipping than did the cBN sintered body cutting tools of the invention with heat resistant film removed from the flank face. It is understood that this is because the crater wear KT of the rake face, which differs from the planar wear of VB on the flank face, develops into crater shapes; chipping tends to occur because the wedge angle of the cutting edge part is reduced by the development of this crater wear KT; and the development of KT is accelerated by the removal of the heat resistant film from the tool face.

In samples 131 to 133, in which an oil mist discharge amount was 1 cc to 300 cc/hour, little affected layer by machining was generated, and the residual compression stress value was also high in spite of the same width of flank wear VB as sample 128 that did not use a coolant.

It is supposed that this is because the oil mist penetrates the boundary surface between the tool and machined object by the discharging a suitable amount of mist oil, and the generation of heat during cutting is suppressed by the reduced friction.

Meanwhile, in sample 130, in which the amount of oil mist discharged was less than 1 cc/hour, and in sample 134, in which the amount exceeded 300 cc/hour, the effect of surface integrity improvement as in samples 131 to 133 was not observed. It is understood that this is because if too little is discharged, the oil mist lubricating effect is not demonstrated, and if too much, then the penetration to the surface boundary between the tool and machined surface becomes difficult because of the aggregation of particles of oil mist.

BRIEF DESCRIPTION OF THE DRAWINGS

[FIG. 2] This is a diagram to explain the portion related to cutting of a cBN sintered body cutting tool of the present invention. (a), (b), (c), (d) and (e) are drawings that show the cBN sintered body cutting tool, the back relief angle α of, the back relief angle α of and inclination angle αs, the side rake angle αb and the side relief angle αos, and, an enlarged view of the insert of cutting tool, respectively.

Figure 1:
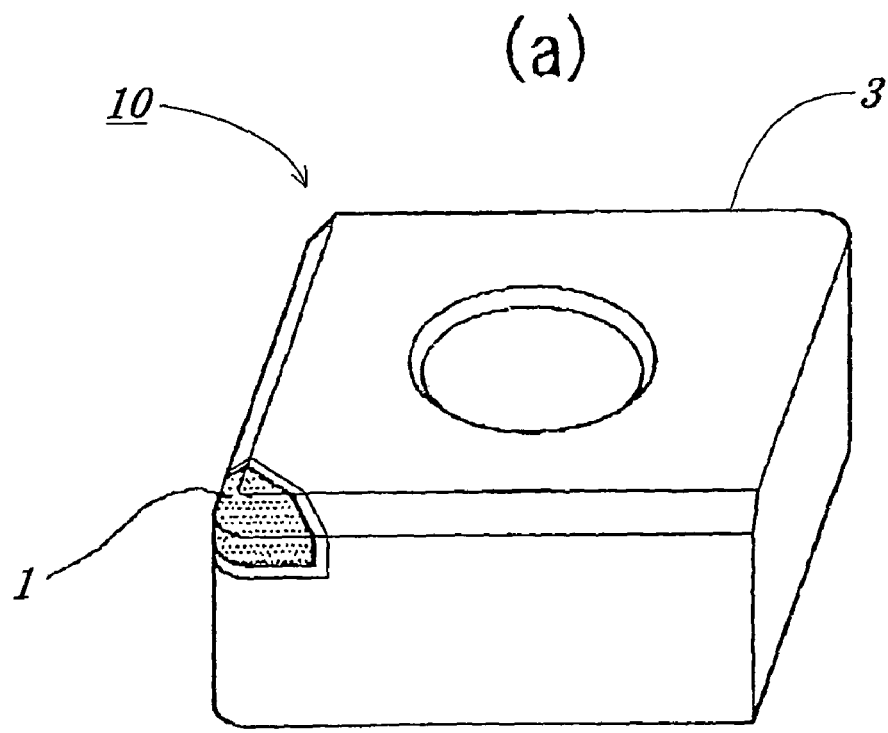
[FIG. 1] This figure indicates an example of a cBN sintered body cutting tool of the present invention. (a) is a perspective view, and (b) is an enlarged partial view of the cBN sintered body.
Figure 1:
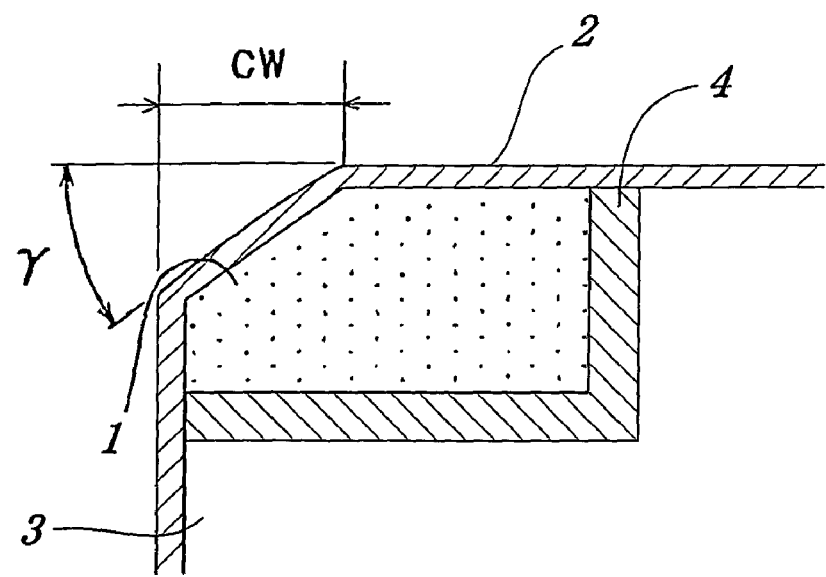

DESCRIPTION OF REFERENCE NUMERALS 1 cBN sintered body
2 Heat resistant film
3 Support member (substrate)
4 Brazing material part
10 cBN sintered body cutting tool

The invention claimed is:

1. A cBN sintered body for high surface integrity machining, comprising not less than 60% and not more than 95% of cBN component in volume %, having a thermal conductivity of 70 W/m·K or more, and an outermost surface of the cBN sintered body being coated with a heat resistant film having a thickness of 0.5 to 12 μm and comprising a compound of at least one element selected from 4a, 5a, 6a group elements and Al, and at least one element selected from C, N and O.

2. A cBN sintered body according to claim 1, comprising not less than 72% and not more than 95% of cBN component in volume %, having a thermal conductivity of 80 W/m·K or more, having as binder materials, at least one selected from nitrides, carbides and carbonitrides of 4a, 5a, 6a group elements and an Al compound having a percentage in said binder materials of not more than 20% in wt %, a ratio of a sum M of mole number of the 4a, 5a, 6a group elements with respect to a sum of mole numbers of C and N in components other than said cBN components being not less than 1.3 and not more than 1.6, and an outermost surface of the cBN sintered body being coated with a heat resistant film having a thickness of 0.5 to 12 μm and comprising a compound of at least one element selected from 4a, 5a, 6a group elements and Al, and at least one element selected from C, N and O.

3. A cBN sintered body according to claim 1, wherein, an average particle diameter of cBN particles constituting said cBN sintered body is not less than 2 μm and not more than 4 μm;

the cBN component contains carbon, oxygen and at least one element selected from Li, Si, Al, Ca and Mg;

a sum of said contained carbon and at least one element selected from Li, Si, Al, Ca and Mg is not less than 0.02% and not more than 0.2% by wt % with respect to said cBN component;

the cBN sintered body comprises a highly pure cBN component in which an amount of oxygen with respect to the cBN component is not more than 0.17% by wt %, and has a thermal conductivity of not less than 85 W/m·K.

4. A cBN sintered body according to claim 1, wherein a mole ratio of B with respect to N in the cBN component constituting the cBN sintered body is not less than 1.15 and not more than 1.20.

5. A cBN sintered body according to claim 1, wherein said heat resistant film has a thermal conductivity of not less than 30 W/m·K and not more than 45 W/m·K.

6. A cBN sintered body cutting tool for high surface integrity machining, wherein the cBN sintered body according to claim 1 is bonded through a brazing material to or is sintered integrally with a support member comprising carbide, cermet, ceramic or a ferrous material; and the cBN sintered body part and the brazing material part have thermal conductivities of not less than 80 W/m·K.

7. A cBN sintered body cutting tool according to claim 6, wherein said brazing material part includes at least one selected from Ti and Zr, and at least one selected from Ag and Cu, and is composed of a brazing material having a thermal conductivity of not less than 220 W/m·K, a thickness of the brazing material part is not less than 0.02 mm and not more than 0.20 mm, and no vacancies having a major diameter exceeding 0.5 mm are contained in the brazing material.

8. A cBN sintered body cutting tool according to claim 6, comprising 5% to 40% in volume of cBN particles or diamond particles with an average particle diameter of not less than 5 and not more than 150 μm inside said brazing part, and having a thermal conductivity of not less than 280 W/m·K.

9. A cBN sintered body cutting tool according to claim 6, wherein a region of said heat resistant film having an area of not less than 10% and not more than 80% with respect to a cutting cross-sectional area Q defined by $$Q=\{R^2 \cdot \tan^{-1}[f/\mathrm{sqr}(4R^2-f^2)]+0.25f \cdot \mathrm{sqr}(4R^2-f^2)+f(d-R)\}/(\cos \alpha s \cdot \cos \alpha b),$$

with assuming nose R, depth of cut d, feed rate f, side rake angle αb and inclination angle αs, is removed in a portion of said cBN sintered body cutting tool participating in cutting, and the cBN sintered body directly contacts a workpiece to be cut during cutting.

10. A cBN sintered body cutting tool according to claim 6, wherein, in a portion participating in cutting of a tool flank of said cBN sintered body cutting tool, a region of the heat resistant film having an area of not less than 10% and not more than 80% with respect to said cutting cross-sectional area Q is removed, and the cBN sintered body directly contacts a workpiece to be cut during cutting.

* * * * *